(12) United States Patent
Kang et al.

(10) Patent No.: US 10,404,900 B2
(45) Date of Patent: Sep. 3, 2019

(54) PHOTOGRAPHING APPARATUS, UNMANNED AERIAL VEHICLE HAVING THE PHOTOGRAPHING APPARATUS, AND ATTITUDE CONTROL METHOD FOR THE PHOTOGRAPHING APPARATUS

(71) Applicant: Samsung Electronics Co., Ltd., Suwon-si, Gyeonggi-do (KR)

(72) Inventors: Yoon-seok Kang, Seoul (KR); Jae-kyu Shim, Suwon-si (KR); Bae-seok Lim, Suwon-si (KR); Woo-jong Cho, Suwon-si (KR); Bon-min Koo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 268 days.

(21) Appl. No.: 15/139,549

(22) Filed: Apr. 27, 2016

(65) Prior Publication Data

US 2016/0337562 A1 Nov. 17, 2016

(30) Foreign Application Priority Data

May 15, 2015 (KR) ........................ 10-2015-0068180

(51) Int. Cl.
*H04N 5/77* (2006.01)
*H04N 5/225* (2006.01)
*H04N 7/18* (2006.01)
*B64D 47/08* (2006.01)
*B64C 39/02* (2006.01)
*G03B 15/00* (2006.01)
*H04N 5/232* (2006.01)

(52) U.S. Cl.
CPC ......... *H04N 5/2254* (2013.01); *B64C 39/024* (2013.01); *B64D 47/08* (2013.01); *G03B 15/006* (2013.01); *H04N 5/2257* (2013.01); *H04N 7/183* (2013.01); *B64C 2201/108* (2013.01); *B64C 2201/127* (2013.01); *H04N 5/23203* (2013.01)

(58) Field of Classification Search
CPC .................................................. H04N 5/2254
USPC .................................................... 348/48, 38
See application file for complete search history.

(56) References Cited

U.S. PATENT DOCUMENTS 7,124,656 B2 10/2006 Miller
2009/0219402 A1 9/2009 Schneider
2009/0245768 A1 10/2009 Uenaka
(Continued)

FOREIGN PATENT DOCUMENTS

EP 1263214 A2 12/2002
EP 2728308 A2 5/2014
(Continued)

*Primary Examiner* — Leron Beck
(74) *Attorney, Agent, or Firm* — Jefferson IP Law, LLP

(57) ABSTRACT

A photographing apparatus is provided. The photographing apparatus includes a photographing unit comprising a photographing sensor and a lens unit configured to focus image light onto the photographing sensor, a first driver configured to drive the photographing sensor to perform a first rotation about a first axis that is coincide with an optical axis of the lens unit, and a second driver configured to drive the photographing unit and the first driver to perform a second rotation about a second axis that is perpendicular to the first axis.

18 Claims, 18 Drawing Sheets

(56) References Cited

U.S. PATENT DOCUMENTS

| | | | |
|---|---|---|---|
| 2009/0326816 A1* | 12/2009 | Park | G01C 21/165 |
| | | | 701/501 |
| 2014/0362242 A1 | 12/2014 | Takizawa | |
| 2015/0077033 A1 | 3/2015 | Lee et al. | |
| 2015/0098012 A1 | 4/2015 | Kobayashi | |
| 2015/0303775 A1 | 10/2015 | Shim et al. | |
| 2016/0337562 A1* | 11/2016 | Kang | H04N 5/2254 |

FOREIGN PATENT DOCUMENTS

| | | |
|---|---|---|
| EP | 2759480 A1 | 7/2014 |
| JP | H09154057 A | 6/1997 |
| KR | 10-2015-0121563 A | 10/2015 |

\* cited by examiner

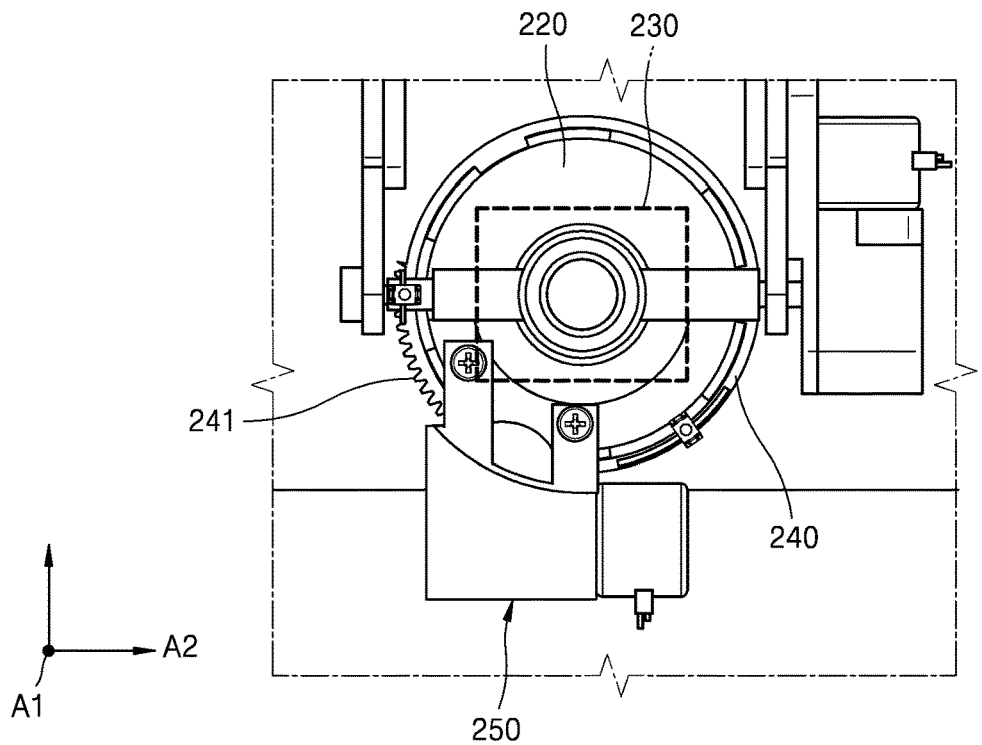
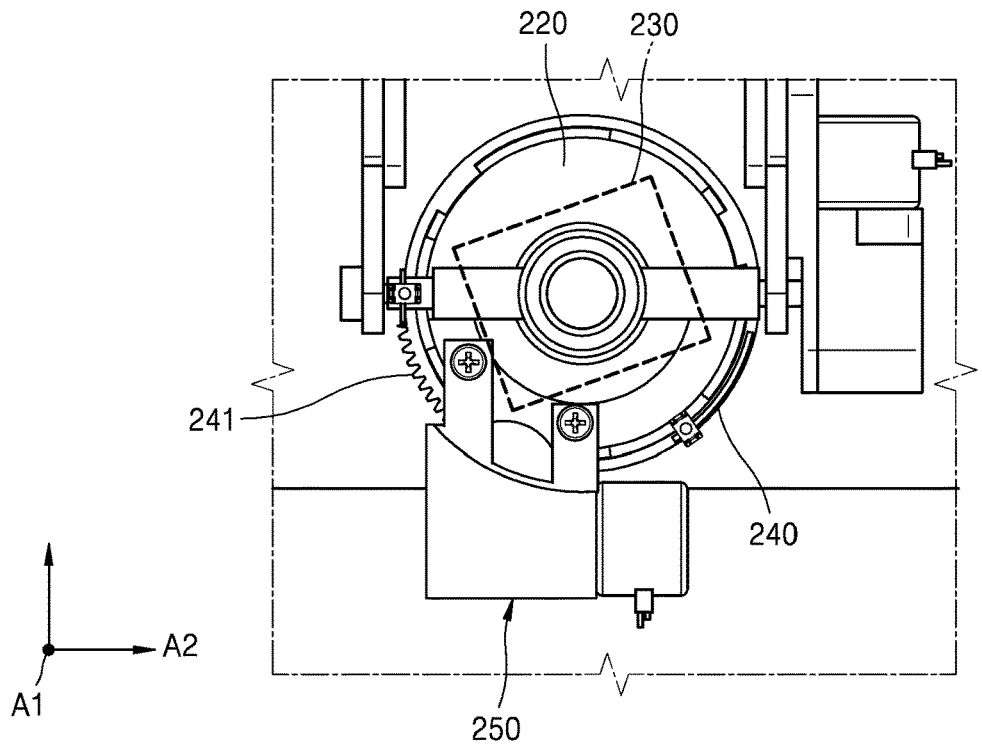

PHOTOGRAPHING APPARATUS, UNMANNED AERIAL VEHICLE HAVING THE PHOTOGRAPHING APPARATUS, AND ATTITUDE CONTROL METHOD FOR THE PHOTOGRAPHING APPARATUS

CROSS-REFERENCE TO RELATED APPLICATION(S)

This application claims the benefit under 35 U.S.C. § 119(a) of a Korean patent application filed on May 15, 2015 in the Korean Intellectual Property Office and assigned Serial No. 10-2015-0068180, the entire disclosure of which is hereby incorporated by reference.

TECHNICAL FIELD

The present disclosure relates to a photographing apparatus mounted on an unmanned aerial vehicle (herein after, unmanned vehicle), an unmanned vehicle having the photographing apparatus, and a method of controlling an attitude of the photographing apparatus.

BACKGROUND

Examples of flight vehicles include a manned vehicle that is boarded and controlled by a user, and an unmanned vehicle that is controlled by an external source or automatically controlled without being boarded by a user.

Because of a recently-advanced algorithm, an ultra-precise sensor, and developments in network communication technology, the performance of unmanned vehicles is improving, and the number of fields in which unmanned vehicles are used is increasing.

Unmanned vehicles may include a photographing apparatus and can capture images of places that are inaccessible by a user. Recently, there has been an increase in the use of an apparatus and method of capturing a high-resolution image by an unmanned vehicle. However, a photograph taken by the photographing apparatus included with an unmanned vehicle may have an improper photographing attitude. Accordingly, there is a need for an apparatus and method for correcting a photographing attitude of a photographing apparatus when an image is captured using an unmanned vehicle.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide photographing apparatuses capable of correcting a photographing attitude, unmanned vehicles having the photographing apparatuses, and attitude control methods for the photographing apparatuses.

In accordance with an aspect of the present disclosure, a photographing apparatus is provided. The photographing apparatus includes a photographing unit comprising a photographing sensor and a lens unit configured to focus image light onto the photographing sensor, a first driver configured to drive the photographing sensor to perform a first rotation about a first axis that coincides with an optical axis of the lens unit, and a second driver configured to drive the photographing unit and the first driver to perform a second rotation about a second axis that is perpendicular to the first axis.

The photographing apparatus may further include a base, and the photographing unit may be supported by the base to be rotated about the second axis.

The photographing apparatus may further include a first location detection sensor configured to detect a rotation amount of the photographing sensor with respect to the first axis and a second location detection sensor configured to detect a rotation amount of the photographing unit and the first driver.

The photographing apparatus may further include a photographing apparatus controller configured to control the first driver and the second driver to perform the first rotation and the second rotation, based on attitude information of the photographing apparatus.

The photographing unit may include a lens holder configured to receive the lens unit and a photographing sensor holder configured to receive the photographing sensor and rotate about the first axis. The first driver may be supported by the lens holder.

The lens unit may include a first lens unit and a second lens unit, and the photographing unit may include a lens holder configured to receive the first lens unit and a photographing sensor holder configured to receive the second lens unit and the photographing sensor. The first driver may be supported by the lens holder.

The first driver may include a power device that detects a driving amount thereof.

In accordance with another aspect of the present disclosure, an unmanned vehicle is provided. The unmanned vehicle includes a flying body and a photographing apparatus mounted on the flying body. The photographing apparatus includes a photographing sensor, a lens unit configured to focus image light onto the photographing sensor, and a first driver configured to drive the photographing sensor to perform a first rotation about a first axis that coincides with an optical axis of the lens unit.

The photographing apparatus may further include a lens holder configured to receive the lens unit and a photographing sensor holder configured to receive the photographing sensor and perform a first rotation about the first axis.

The photographing apparatus may further include a second driver configured to drive the photographing sensor, the lens unit, and the first driver to perform a second rotation about a second axis that is perpendicular to the first axis.

The photographing apparatus may further include a lens holder configured to receive the lens unit and a photographing sensor holder configured to receive the photographing sensor and rotate about the first axis.

The lens unit may include a first lens unit and a second lens unit, and the photographing apparatus may include a lens holder configured to receive the first lens unit and a photographing sensor holder configured to receive the second lens unit and the photographing sensor.

The first driver may be supported by the lens holder.

The unmanned vehicle may further include a controller configured to control the first driver and the second driver based on attitude information of the unmanned vehicle.

In accordance with another aspect of the present disclosure, a method of controlling an attitude of a photographing apparatus is provided. The method includes capturing an image by using a photographing apparatus mounted on an unmanned vehicle, the photographing apparatus including a lens unit and a photographing sensor on which image light transmitted by the lens unit is focused, detecting attitude information of the unmanned vehicle, and driving the photographing sensor to perform a first rotation about a first axis that coincides with an optical axis of the lens unit, based on the attitude information of the unmanned vehicle.

The method may further include driving the lens unit and the photographing sensor to perform a second rotation about a second axis that is perpendicular to the first axis, based on the attitude information of the unmanned vehicle.

Other aspects, advantages, and salient features of the disclosure will become apparent to those skilled in the art from the following detailed description, which, taken in conjunction with the annexed drawings, discloses various embodiments of the pre sent disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 7A is a front view illustrating a photographing apparatus according to an embodiment of the present disclosure in a horizontal state;

FIG. 7B is a front view illustrating a photographing apparatus according to an embodiment of the present disclosure that has driven first rotation;

Throughout the drawings, like reference numerals will be understood to refer to like parts, components, and structures.

DETAILED DESCRIPTION

Figure 1:
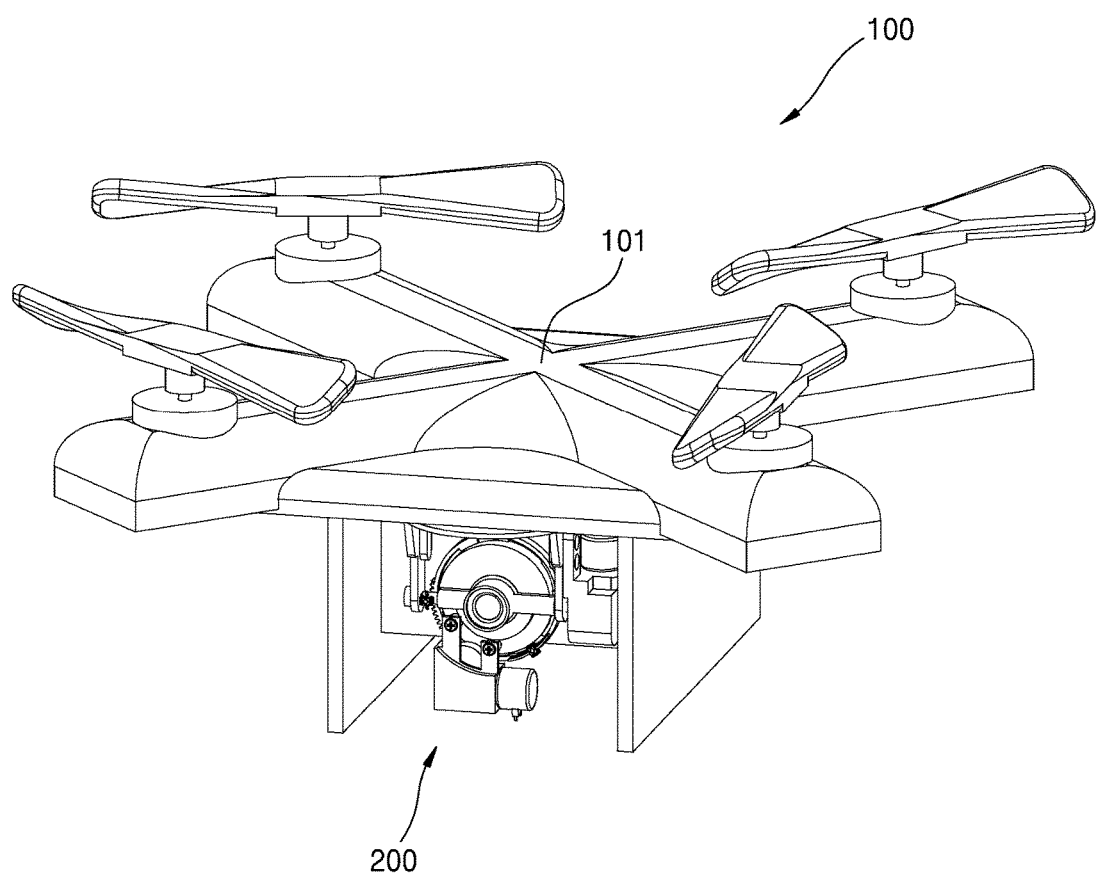
FIG. 1 is a perspective view of an unmanned vehicle according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While such terms as "first," "second," etc., may be used to describe various components, such components should not be limited to the above terms. The above terms are used only to distinguish one component from another. For example, a first component discussed below could be termed a second component, and similarly, a second component may be termed a first component, without departing from the teachings of this disclosure. The term "and/or" includes any and all combinations of one or more of the associated listed items.

An application denotes software that is executed on an operating system (OS) for computers or a mobile OS and is directly used by a user. Examples of the application may include a word processor, a spreadsheet, a social network system (SNS), chatting, a map, a music player, and a moving picture player.

A widget denotes a mini application which is a graphical user interface (GUI) that more smoothly supports an interaction between a user and either an application or an OS. For example, there are a weather widget, a calculator widget, and a time widget. The widget may be formed as a shortcut icon and installed on a desktop, a mobile device, a blog, an Internet café, a personal homepage, and the like, and enables direct use of a service via clicking, rather than via a web browser. The widget may include a shortcut to a designated path or a shortcut icon via which a designated application is executable.

The terms used in the present specification are merely used to describe embodiments, and are not intended to limit the present disclosure. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. Like reference numerals in the drawings denote like elements performing substantially the same function.

FIG. 1 is a perspective view of an unmanned vehicle according to an embodiment of the present disclosure.

Figure 2:
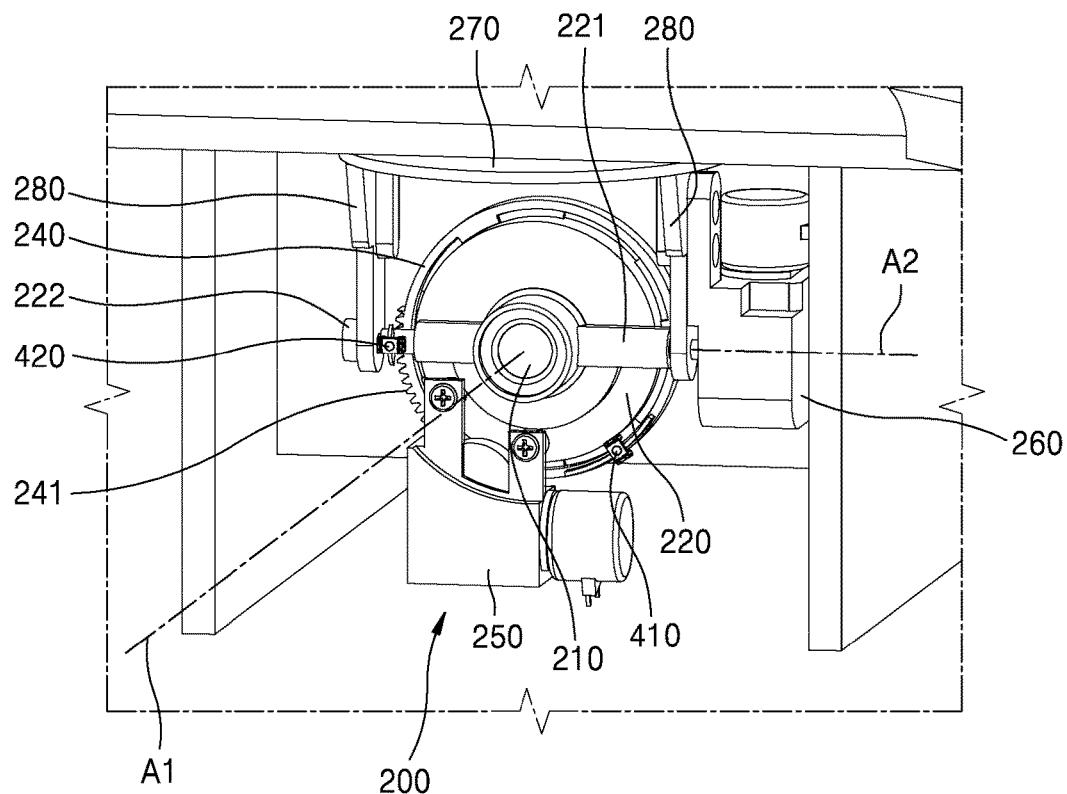
FIG. 2 is a schematic perspective view of a photographing apparatus equipped with an attitude correcting function according to an embodiment of the present disclosure.

FIG. 2 is a schematic perspective view of a photographing apparatus equipped with an attitude correcting function according to an embodiment of the present disclosure.

Figure 3:
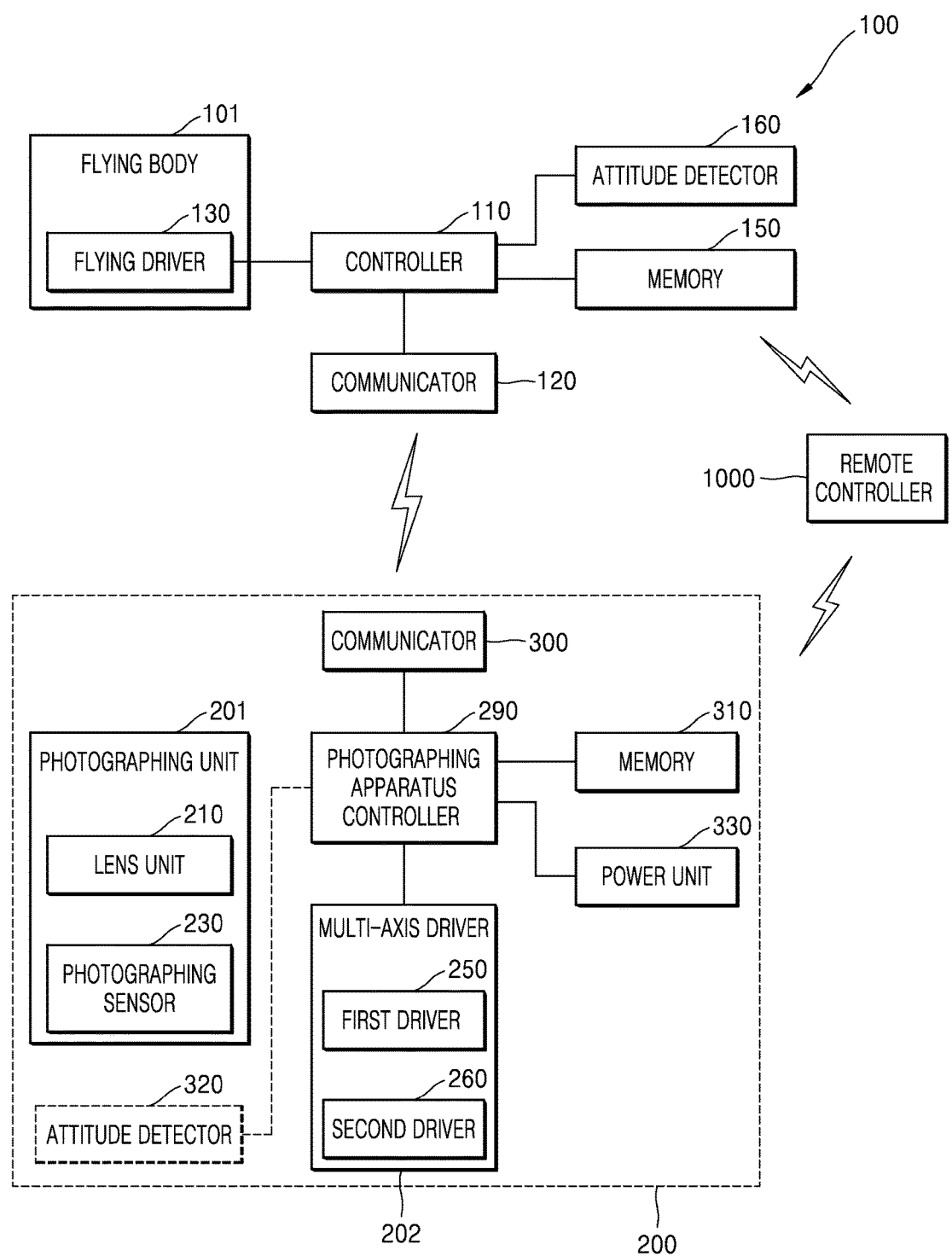
FIG. 3 is a schematic block diagram of an unmanned vehicle and a photographing apparatus according to an embodiment of the present disclosure.

FIG. 3 is a schematic block diagram of an unmanned vehicle and a photographing apparatus according to an embodiment of the present disclosure.

Referring to FIGS. 1 to 3, an unmanned vehicle 100 includes a flying body 101, and a photographing apparatus 200 mounted on the flying body 101 to capture an image. The flying body 101 includes a flying driver 130 for driving the unmanned vehicle 100 to fly. The unmanned vehicle 100 further includes a controller 110 for controlling the unmanned vehicle 100, and a communicator 120 for communication with a remote controller 1000.

The communicator 120 receives a control signal of the remote controller 1000 for controlling the unmanned vehicle 100. The communicator 120 may transmit information about a flight state of the unmanned vehicle 100 to the remote controller 1000.

The flying driver 130 generates power for elevating the flying body 101 in the air. For example, the flying driver 130 may include at least one propeller, a gear unit, a motor, and the like. The flying driver 130 drives the motor according to a signal of the controller 110 and transmits a driving force to the propeller via the gear unit. The propeller may generate a lifting force via rotation to elevate the unmanned vehicle 100 in the air.

The controller 110 controls a motion of the unmanned vehicle 100 by driving the flying driver 130 according to the control signal received from the remote controller 1000 via the communicator 120.

The unmanned vehicle 100 has a plurality of flight modes. The plurality of flight modes include a manual mode, an automatic mode, and a semi-automatic mode.

For example, the controller 110 may support a manual mode in which a detailed flight operation is performed according to the control signal of the remote controller 1000, an automatic mode in which the detailed flight operation is performed according to pre-programmed settings, and a semi-automatic mode in which a portion of the detailed flight operation is performed according to the pre-programmed settings and the remaining portion thereof is performed according to the control signal of the remote controller 1000. The flight modes may be pre-stored as a program in a memory 150.

When the controller 110 receives from the remote controller 1000 a signal for converting a flight mode of the unmanned vehicle 100 to a semi-automatic mode, the controller 110 may control the flying driver 130 to stop an operation performed immediately before a conversion of the flight mode into the semi-automatic mode, automatically hover, and simultaneously wait for the control signal of the remote controller 1000.

When the controller 110 receives a detailed flight control signal from the remote controller 1000 while automatically hovering in the semi-automatic mode, the controller 110 additionally performs a detailed flight operation corresponding to the received detailed flight control signal.

When the controller 110 no longer receives the detailed flight control signal, the controller 110 may control the flying driver 130 to wait for the control signal of the remote controller 1000 while hovering again.

The photographing apparatus 200 is mounted on the flying body 101. The photographing apparatus 200 according to an embodiment may be implemented as various types, such as, an apparatus capturing a still image and an apparatus creating a moving picture. The photographing apparatus 200 may include a photographing unit 201, a photographing apparatus controller 290, and a multi-axis driver 202 for multi-axially rotating the photographing unit 201.

The photographing unit 201 includes a photographing sensor 230 and a lens unit 210 focusing image light on a photographing surface of the photographing sensor 230. The lens unit 210 may include one lens or a plurality of lenses. The plurality of lenses may include a zoom lens for enlarging or shrinking the size of a subject, and a focusing lens for adjusting the focus of the subject. The plurality of lenses are driven by a driving means, such as a zoom motor (not shown) or an auto focusing (AF) motor (not shown), and thus relative locations of the plurality of lenses may be changed. An optical structure and a lens driving structure for focus adjustment, and an optical structure and a lens driving structure for zoom adjustment may be any of various structures known in the field to which the present disclosure pertains. The photographing apparatus controller 290 may control the locations of the plurality of lenses to achieve zoom magnification adjustment and focus adjustment.

The photographing sensor 230 receives the image light and converts the image light into an electrical signal. The photographing sensor 230 includes an optoelectronic conversion device such as a charged-coupled device (CCD) or a complementary metal-oxide semiconductor (CMOS), and converts the image light received via the lens unit 210 into an electrical signal. The electrical signal generated by the photographing sensor 230 is converted into image data by the photographing apparatus controller 290.

For example, the photographing apparatus controller 290 may convert the electrical signal of the photographing sensor 230 into red, green, blue (RGB) data and then convert the RGB data into raw data having a form, such as a YUV signal including a luminance (Y) signal and a chrominance (UV) signal. The conversion by the photographing apparatus controller 290 may include, for example, an operation of reducing driving noise of the photographing sensor 230 included in the electrical signal by using a correlated double sampling (CDS) circuit, an operation of adjusting the gain of a signal obtained after the noise reduction by using an automatic gain control (AGC) circuit, an operation of converting an analog signal to a digital signal by using an analog-to-digital converter (ADC), and detailed operations such as signal processing, for example, pixel defect correction, gain correction, white balance correction, and gamma correction, with respect to the digital signal.

The photographing apparatus controller 290 controls data writing to a memory 310 and readout of written data or setting information. The memory 310 may be a volatile memory, and may include, for example, a semiconductor memory such as synchronous dynamic random access memory (SDRAM). The memory 310 may perform a buffer memory function of temporarily storing image data generated by the photographing apparatus controller 290, and a work memory function for use in data processing.

The memory 310 may be a non-volatile memory, for example, a flash memory (e.g., a memory stick or a secure digital (SD)/multimedia card (MMC)), a storage device such as a hard disk drive (HDD), or an optical storage device such as a digital versatile disc (DVD) or a compact disc (CD). In this case, the memory 310 may store image data compressively converted into a JPEG file, a TIF file, a GIF file, a PCX file, an AVI file, or the like by the photographing apparatus controller 290.

A communicator 300 and the communicator 120 of the unmanned vehicle 100 may include, for example, a wired communication module, a cellular module, a Wi-Fi module, a Bluetooth module, a global navigation satellite system (GNSS) module (e.g., a global positioning system (GPS) module, a GLONASS module, a BeiDou module, or a Galileo module), a near field communication (NFC) module, and a radio frequency (RF) module.

The communicator 300 and the communicator 120 of the unmanned vehicle 100 may transmit or receive data to or from each other. For example, the communicator 300 may transmit data about a driving state of the multi-axis driver 202, which will be described later, to the communicator 120 of the unmanned vehicle 100. The controller 110 of the unmanned vehicle 100 may control the flying driver 130 of the unmanned vehicle 100, based on the received data.

When the photographing apparatus controller 290 receives information about a flight state of the unmanned vehicle 100 via the communicator 300, the photographing apparatus controller 290 may control the multi-axis driver 202 of the photographing apparatus 200, based on the received information. This may help the unmanned vehicle 100 to capture a more stable image. The information about the flight state includes various pieces of information that are acquired by the controller 110 of the unmanned vehicle 100 while the unmanned vehicle 100 is flying. For example, the information about the flight state may be attitude information of the unmanned vehicle 100 that may be acquired via an attitude detector 160 while the unmanned vehicle 100 is flying. The attitude information includes information about rotating angles of the unmanned vehicle 100 with respect to a roll axis, a pitch axis, and a yaw axis, and information about tilting angles of the unmanned vehicle 100 with respect to the roll axis, the pitch axis, and the yaw axis.

The photographing apparatus controller 290 is electrically connected to the photographing sensor 230, the lens unit 210, the memory 310, the communicator 300, and the like, and performs a function, such as transmitting or receiving a control signal to or from these components or processing data, to control an operation of each of the components. The photographing apparatus controller 290 may be implemented using a microchip or a circuit board including a microchip, and the components included in the photographing apparatus controller 290 may be implemented by software or circuits embedded in the photographing apparatus controller 290.

The multi-axis driver 202 may be controlled by the photographing apparatus controller 290. The photographing apparatus controller 290 may communicate with the controller 110 of the unmanned vehicle 100 to control the multi-axis driver 202 based on a driving control signal received from the controller 110. The photographing apparatus controller 290 may control the multi-axis driver 202 independently from the controller 110 of the unmanned vehicle 100. The multi-axis driver 202 may individually or simultaneously perform a first rotation and a second rotation. The first rotation and the second rotation will be described later.

The unmanned vehicle 100 may include the attitude detector 160. The attitude detector 160 detects attitudes of the unmanned vehicle 100 with respect to the roll axis, the pitch axis, and the yaw axis. The attitude detector 160 may include one of, for example, a gesture sensor, a gyroscope sensor, a pressure sensor, and an acceleration sensor. The attitude detector 160 may transmit the attitude information of the unmanned vehicle 100 to the controller 110. The controller 110 may transmit the attitude information to the photographing apparatus controller 290. The photographing apparatus controller 290 may control the multi-axis driver 202, based on the attitude information.

As indicated by a dotted line of FIG. 3, the photographing apparatus 200 may include an attitude detector 320. In this case, the attitude information detected by the attitude detector 320 may be transmitted directly to the photographing apparatus controller 290, without using the controller 110. The controller 110 may receive the attitude information via the photographing apparatus controller 290 and may refer to the attitude information during flight control. The attitude detector 320 for controlling the multi-axis driver 202 and the attitude detector 160 for flight control may be separately included.

Embodiments of a structure of the photographing apparatus 200 will now be described.

Figure 4:
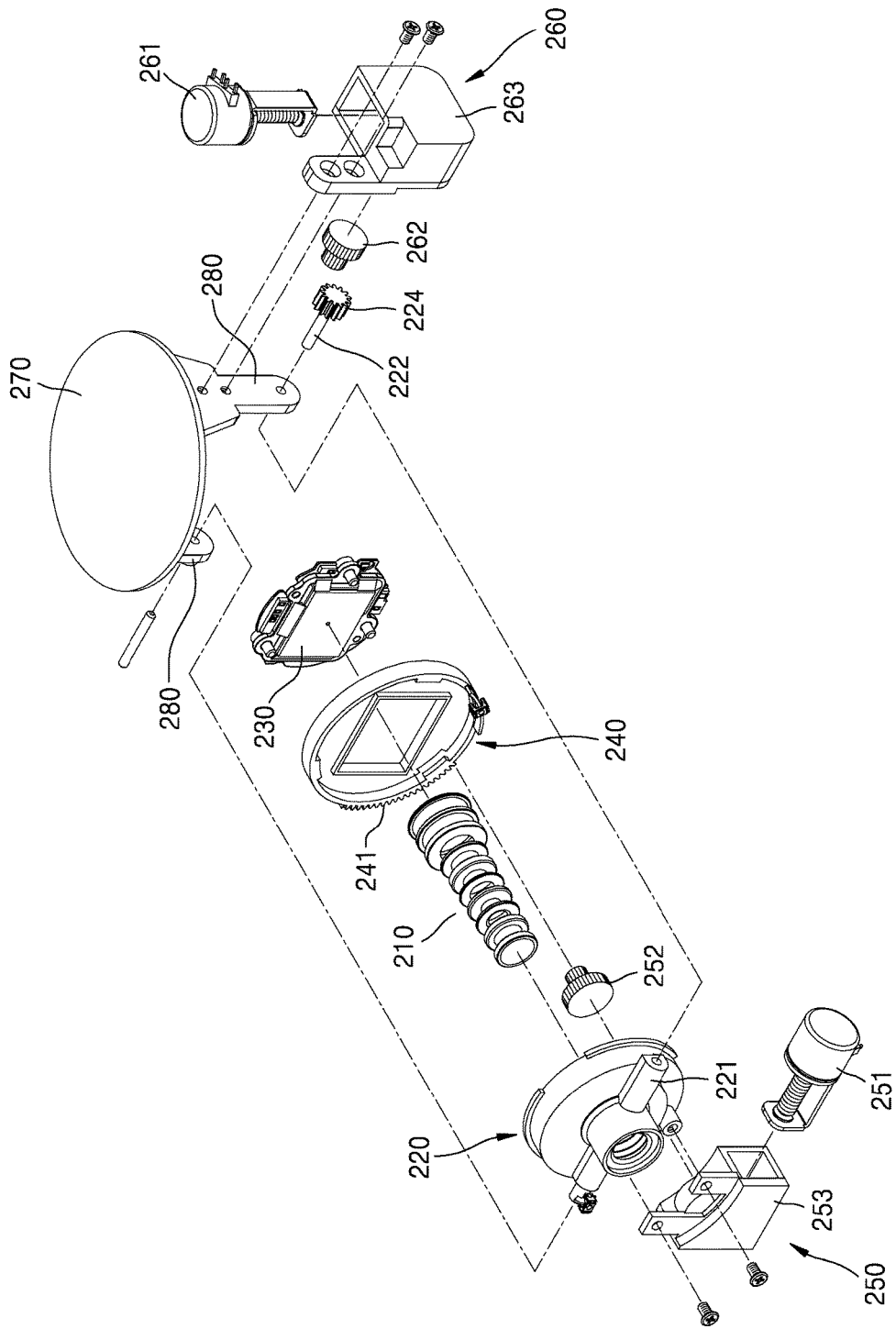
FIG. 4 is a schematic exploded perspective view of a photographing apparatus according to an embodiment of the present disclosure.

FIG. 4 is a schematic exploded perspective view of a photographing apparatus according to an embodiment of the present disclosure.

Referring to FIGS. 2 and 4, the lens unit 210 is received by a lens holder 220. The photographing sensor 230 is received by a photographing sensor holder 240.

The lens holder 220 is supported by a base 270. The base 270 is coupled to the flying body 101. The base 270 may be detachably coupled to the flying body 101. The base 270 may be integrally formed with the flying body 101. The photographing sensor holder 240 may be supported by the lens holder 220 such that the photographing sensor holder 240 may rotate about a first axis A1, which coincides with an optical axis of the lens unit 210.

Figure 5:
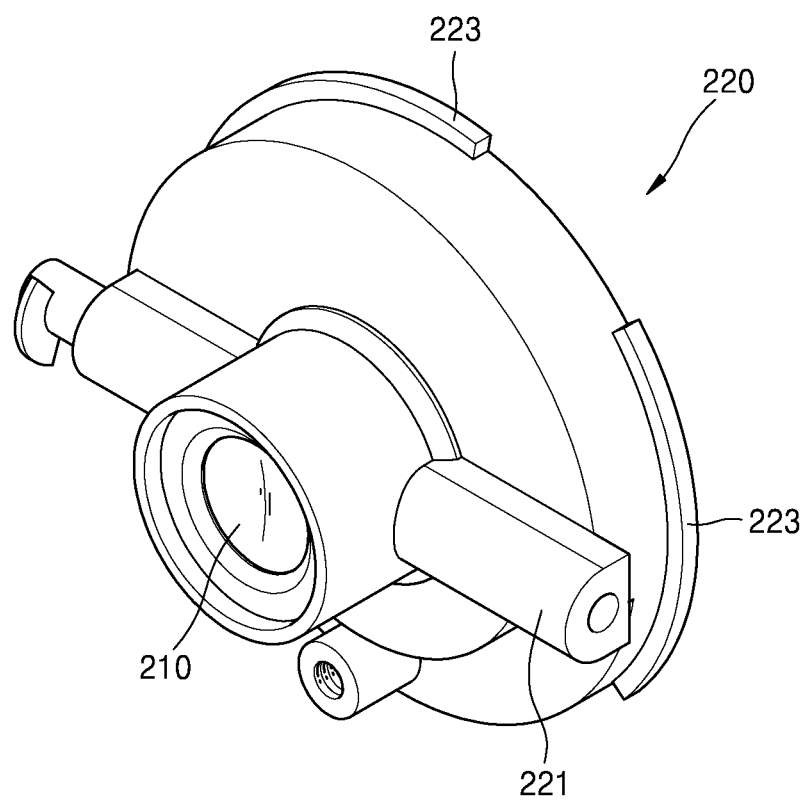
FIG. 5 is a perspective view of a lens holder according to an embodiment of the present disclosure.
Figure 6:
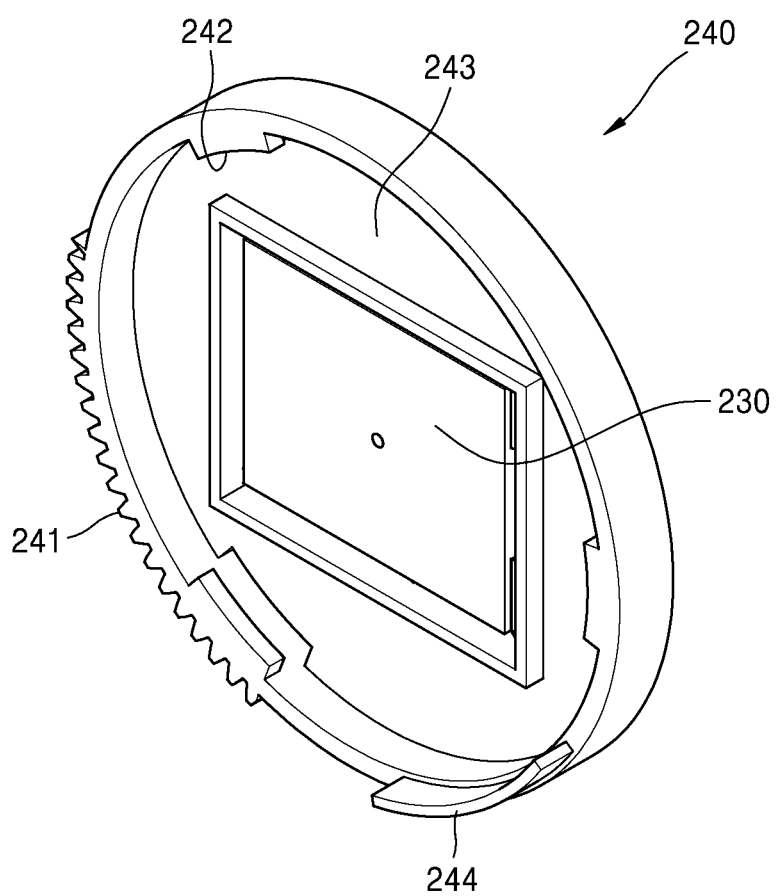
FIG. 6 is a perspective view of a photographing sensor holder according to an embodiment of the present disclosure.

FIG. 5 is a perspective view of a lens holder according to an embodiment of the present disclosure, and FIG. 6 is a perspective view of a photographing sensor holder according to an embodiment of the present disclosure.

Referring to FIGS. 5 and 6, a protrusion 223 is provided on the lens holder 220. The protrusion 223 may be a band that protrudes outwards along an external circumference of the lens holder 220 and has the first axis A1 as its center. A receiver 242 having a complementary shape to the protrusion 223 is provided on the photographing sensor holder 240. For example, the receiver 242 may protrude inwards from an external circumference of the photographing sensor holder 240 and may be spaced apart from a surface 243 of the photographing sensor holder 240 that faces the lens holder 220.

A plurality of protrusions 223 may be spaced apart from one another in a circumferential direction, and a plurality of receivers 242 may be spaced apart from one another in the circumferential direction so as to respectively face the plurality of protrusions 223. The lens holder 220 and the photographing sensor holder 240 are arranged such that the plurality of receivers 242 are positioned at locations between the plurality of protrusions 223, namely, such that the plurality of receivers 242 and the plurality of protrusions 223 do not overlap with each other. Then, as the lens holder 220 and the photographing sensor holder 240 approach each other, the photographing sensor holder 240 is rotated such that the plurality of receivers 242 overlap with the plurality of protrusions 223.

Accordingly, the plurality of protrusions 223 may be accommodated between the receivers 242 and the surface 243, and the photographing sensor holder 240 may be rotated about the first axis A1 with respect to the lens holder 220. To reduce friction during the rotation, a bearing structure may be disposed on the receivers 242 or the protrusions 223.

According to this structure, the photographing sensor 230 may be driven to perform first rotation about the first axis A1 with respect to the lens unit 210. The first axis A1 is a roll axis, and the first rotation is a roll-axis driving.

A valid image region of the photographing sensor 230 may have various sizes. For example, the size of the valid image region of the photographing sensor 230 may be, but is not limited to, a 1/2.3 inch, a 1/1.7 inch, a ⅔ inch, APS-C, or 35 mm (Full frame).

Referring to FIG. 4, the multi-axis driver 202 includes a first driver 250 which drives the photographing sensor 230 to perform the first rotation. The first driver 250 may implement the first rotation by rotating the photographing sensor holder 240. The first driver 250 includes a motor 251. The motor 251 and the photographing sensor holder 240 may be connected to each other via various power connection structures. For example, according to the present embodiment, the motor 251 and the photographing sensor holder 240 are connected to each other by a gear connection structure.

Referring to FIG. 6, a gear unit 241 is provided on the photographing sensor holder 240. The gear unit 241 may be formed according to a first rotation angle range of the photographing sensor 230. As will be described later, an angle range for forming the gear unit 241 may be determined by taking into account an angle range capable of compensating for an inclination of the unmanned vehicle 100 along the first axis A1 during changing the direction of the unmanned vehicle 100. The angle range for forming the gear unit 241 may also be determined by taking into account a photographable angle with respect to the first axis A1, for example, such that the photographing sensor 230 may be rotated by +/−90 degrees. However, the present disclosure is not limited thereto.

Referring back to FIG. 4, the first driver 250 further includes at least one connection gear 252 which connects the motor 251 with the gear unit 241. A driving force of the motor 251 is transmitted to the photographing sensor holder 240 via the connection gear 252 and the gear unit 241. A power connection structure for connecting the motor 251 to the photographing sensor holder 240 is not limited to the gear structure. For example, the motor 251 and the photographing sensor holder 240 may be connected to each other by a belt connection structure (not shown).

FIG. 7A is a front view illustrating a photographing apparatus according to an embodiment of the present disclosure in a horizontal state, and FIG. 7B is a front view illustrating a photographing apparatus according to an embodiment of the present disclosure that has driven first rotation.

Referring to FIG. 7A, the photographing sensor 230 is in a horizontal state. The motor 251 is driven to rotate the photographing sensor holder 240 counterclockwise about the first axis A1. Then, referring to FIG. 7B, the photographing sensor 230 is positioned at a location by rotation about the first axis A1 at a predetermined angle with respect to the lens unit 210.

According to an embodiment, the first driver 250 is supported by the lens holder 220. For example, a first frame 253, on which the motor 251 and the connection gear 252 are mounted, is coupled to the lens holder 220. Although not shown in FIG. 4, the motor 251 and the connection gear 252 may be coupled directly to the lens holder 220.

Referring to FIGS. 2 and 4, the lens holder 220 may be supported by the base 270 such that the lens holder 220 performs a second rotation about a second axis A2 perpendicular to the first axis A1. For example, a pair of supports 280 is provided on the base 270, and a rotational shaft 221 is provided on the lens holder 220. The lens holder 220 is located between the two supports 280, and a pair of shaft support members 222 respectively penetrate through the two supports 280 and are respectively coupled to both ends of the rotational shaft 221. Thus, the lens holder 220 is rotatably supported by the base 270.

According to this structure, the lens unit 210 may be driven to perform a second rotation about the second axis A2. The second axis A2 is a pitch axis, and the second rotation is a pitch-axis driving.

The multi-axis driver 202 may further include a second driver 260 which drives the photographing unit 201 including the photographing sensor 230 and the lens unit 210 to perform second rotation about the second axis A2.

The second driver 260 may implement the second rotation by rotating the lens holder 220. Since the lens unit 210, the photographing sensor holder 240, and the first driver 250 are coupled to the lens holder 220, when the lens holder 220 is rotated about the second axis A2 by the second driver 260, the photographing unit 201 and the first driver 250 are also rotated about the second axis A2.

The second driver 260 includes a motor 261. The motor 261 and the lens holder 220 may be connected to each other via various power connection structures. For example, according to the present embodiment, the motor 261 and the lens holder 220 are power-connected to each other by a gear connection structure. A gear unit 224 is provided on a shaft support member 222 coupled to one end of the rotational shaft 221 of the lens holder 220. The second driver 260 includes at least one connection gear 262 which connects the motor 261 with the gear unit 224.

A driving force of the motor 261 is transmitted to the rotational shaft 221 of the lens holder 220 via the connection gear 262 and the gear unit 224. Accordingly, the second driver 260 may drive the motor 261 so that the photographing unit 201 including the photographing sensor 230, the lens unit 210, and the first driver 250 perform a second rotation about the second axis A2. A power connection structure for connecting the motor 261 to the lens holder 220 is not limited to the gear connection structure. For example, the motor 261 and the lens holder 220 may be connected to each other by a belt connection structure (not shown).

Figure 8A:
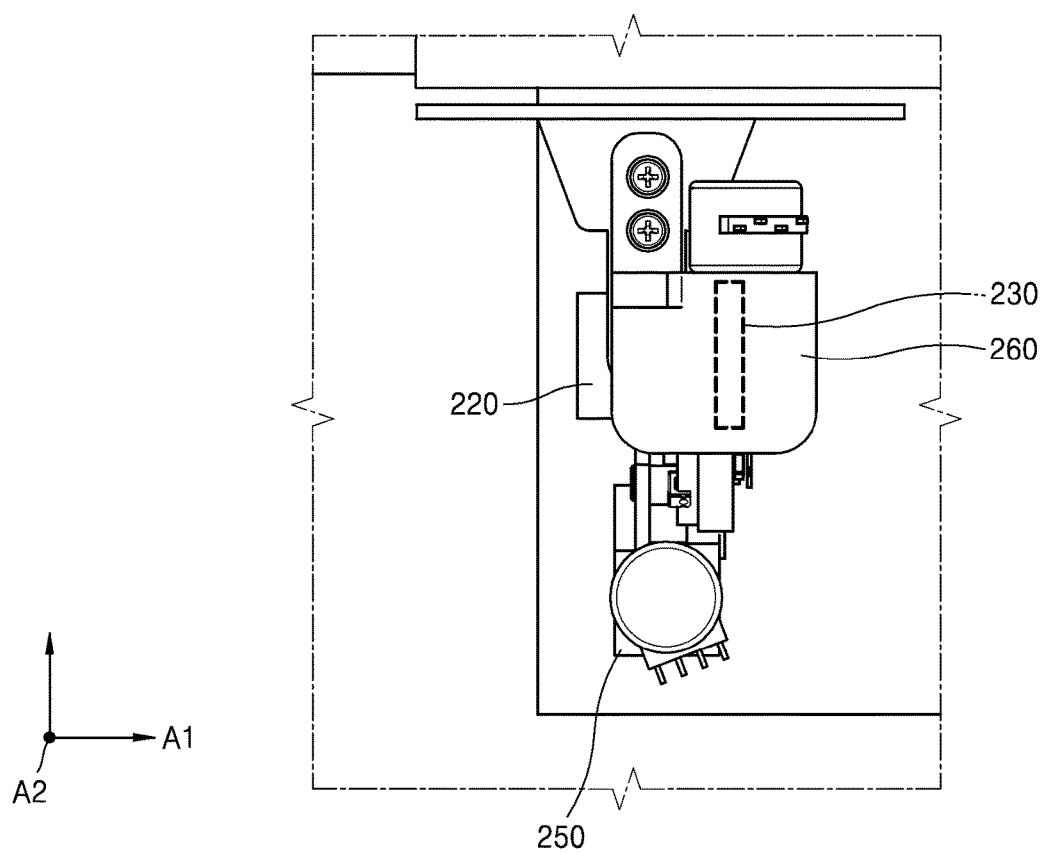
FIG. 8A is a side view illustrating a photographing apparatus according to an embodiment of the present disclosure in a horizontal state.
Figure 8B:
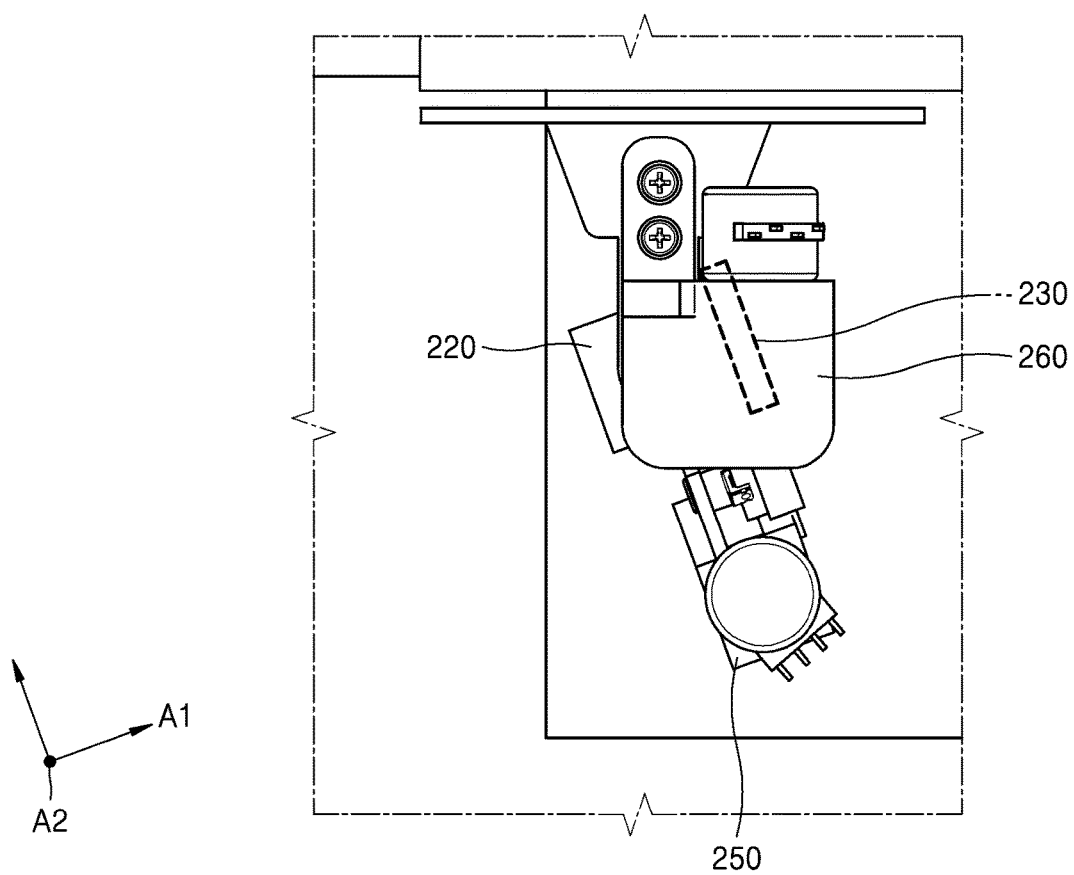
FIG. 8B is a side view illustrating a photographing apparatus according to an embodiment of the present disclosure that has driven second rotation.

FIG. 8A is a side view illustrating a photographing apparatus according to an embodiment of the present disclosure in a horizontal state and FIG. 8B is a side view illustrating a photographing apparatus according to an embodiment of the present disclosure that has driven second rotation.

Referring to FIG. 8A, the photographing sensor 230 is in a horizontal state. The motor 261 is driven to rotate the lens holder 220 counterclockwise about the second axis A2. Then, referring to FIG. 8B, the photographing sensor 230 is rotated about the second axis A2 at a predetermined angle.

As will be described later, a second rotation angle range may be determined by taking into account an angle range capable of compensating for an inclination of the unmanned vehicle 100 along the second axis A2 during forward and backward movements of the unmanned vehicle 100. For example, the second rotating angle range may be determined by taking into account a photographing angle range with respect to the second axis A2 such that the photographing sensor 230 may rotate +120 degrees to −120 degrees. However, the present disclosure is not limited thereto.

According to an embodiment, the second driver 260 may be supported by the base 270. For example, a second frame 263, on which the motor 261 and the connection gear 262 are mounted, is coupled to the base 270. Although not shown FIG. 4, the motor 261 and the connection gear 262 may be coupled directly to the base 270.

A stepping motor, a direct current (DC) motor, a brushless DC (BLDC) motor, a servo motor, a voice coil motor (VCM), an ultrasonic motor, or the like may be used as the motors 251 and 261 of the first driver 250 and the second driver 260. In the case of a stepping motor, a DC motor, a BLDC motor, and a servo motor, a gear connection structure including a reduction gear may be used. When a stepping motor, a DC motor, a BLDC motor, or a servo motor each having a high torque is used, the motors 251 and 261 may rotate the photographing sensor holder 240 or the lens holder 220 without a reduction gear.

According to such a photographing apparatus 200, the first axis A1 coincides with the optical axis of the lens unit 210. Even when this structure performs the first rotation about the first axis A1, an optical axis of the lens unit 210 before rotation coincides with an optical axis of the lens unit 210 after rotation. Accordingly, the controller 110 or the photographing apparatus controller 290 does not need to execute a special control operation in order to make the optical axes before and after the first rotation coincide with each other.

According to such a photographing apparatus 200, the second axis A2 is perpendicular to the optical axis of the lens unit 210, namely, the first axis A1. Even when this structure performs the second rotation about the second axis A2, an optical axis of the lens unit 210 after rotation is inclined by the amount of the second rotation with respect to an optical axis of the lens unit 210 before rotation, but a relative location of the optical axis with respect to the lens unit 210 does not change. Accordingly, the controller 110 or the photographing apparatus controller 290 does not need to execute a special control in order to adjust relative locations of the optical axes before and after the second rotation with respect to the lens unit 210.

According to this photographing apparatus 200, during the first rotation, namely, rolling, instead of the entire portion of the photographing apparatus 200 being rotated about the first axis A1, only the photographing sensor holder 240 having received the photographing sensor 230 is rotated about the first axis A1. Therefore, a compact photographing apparatus 200 capable of being rolled by a simpler structure than a gimbal structure of the related art in which the entire portion of a photographing apparatus is rolled may be realized.

The photographing unit 201 and the first driver 250 are rotated about the second axis A2 by the second driver 260. A driving load of the second driver 260 may be reduced by appropriately determining a location of the center of gravity of a combination of the photographing unit 201 and the first driver 250. The driving load applied to the second driver 260 includes a rotational moment that is generated by the combination of the photographing unit 201 and the first driver 250. The rotational moment is proportional to the weight of the combination and a length of a moment arm from the second axis A2. The weight of the combination is related with the structures of the photographing unit 201 and the first driver 250, and thus there is a limit in reducing the weight of the combination. Thus, the length of the moment arm needs to be reduced. To this end, the center of gravity of the combination of the photographing unit 201 and the first driver 250 may be positioned within a plane that includes the second axis A2 and is perpendicular to the first axis A1. This structure may be realized by, for example, appropriately selecting a location on the photographing unit 201 to which the first driver 250 is to be coupled, and a location of a components included in the first driver 250. Accordingly, by moving or removing a component having a distance from the second axis A2 to the center of gravity of the combination in a direction of the first axis A1, the length of the moment arm may be reduced.

A structure for rolling is simplified, and thus the driving load of the second driver 260 is reduced during driving about the second axis A2, namely, pitching. Accordingly, power consumption for rolling and pitching may be reduced, and the size and weight of a power unit 330 for driving the photographing apparatus 200 may be reduced. By including a compact photographing apparatus 200 and a compact power unit 330, a compact unmanned vehicle 100 may be realized. As the unmanned vehicle 100 becomes compact, long flight of the unmanned vehicle 100 is possible.

Referring to FIG. 2, the photographing apparatus 200 may further include first and second location detection sensors 410 and 420 that detect the first and second rotations, respectively. For example, the first location detection sensor 410 may detect a rotating angle of the photographing sensor holder 240 about the first axis A1. The second location detection sensor 420 may detect a rotating angle of the lens holder 220 about the second axis A2.

For example, the first and second location detection sensors 410 and 420 may be any of various types of sensors, such as magnetic-type sensors (e.g., hall sensors or MR sensors), optical sensors (e.g., photo reflectors or photo interrupters), inductance sensors, capacitive sensors, etc. The first and second location detection sensors 410 and 420 may detect rotation amounts of the motors 251 and 261, respectively. In this case, the first and second location detection sensors 410 and 420 may be embedded in the motors 251 and 261, respectively.

Figure 9:
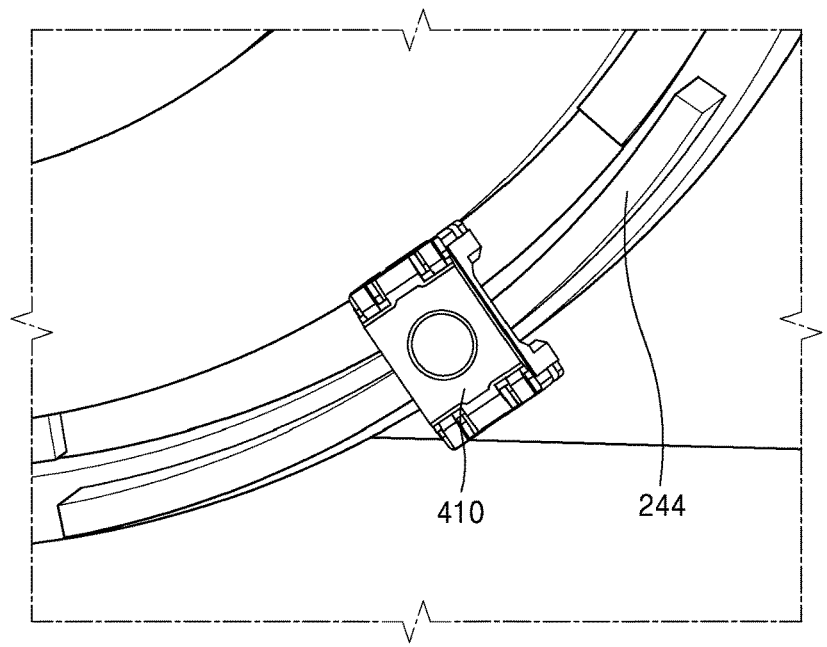
FIG. 9 is a perspective view of a first location detection sensor according to an embodiment of the present disclosure.

FIG. 9 is a perspective view of a first location detection sensor according to an embodiment of the present disclosure.

Referring to FIG. 9, the first location detection sensor 410 may be disposed on the lens holder 220. A first detector 244 shaped into a band having the first axis A1 as its center is provided on the photographing sensor holder 240. For example, when a photo interrupter is used as the first location detection sensor 410, an edge of the first detector 244 may be detected by the first location detection sensor 410, and then the rotating angle of the photographing sensor holder 240 may be calculated from a driving period of the motor 251. When a photo reflector is used as the first location detection sensor 410, reflection patterns (not shown) obtained by alternating white and black portions may be provided on the first detector 244, and the rotating angle of the photographing sensor holder 240 may be calculated from the number of reflection patterns detected by the first location detection sensor 410.

According to this structure, a first rotation amount, namely, a roll-axis rotation amount may be detected.

Figure 10:
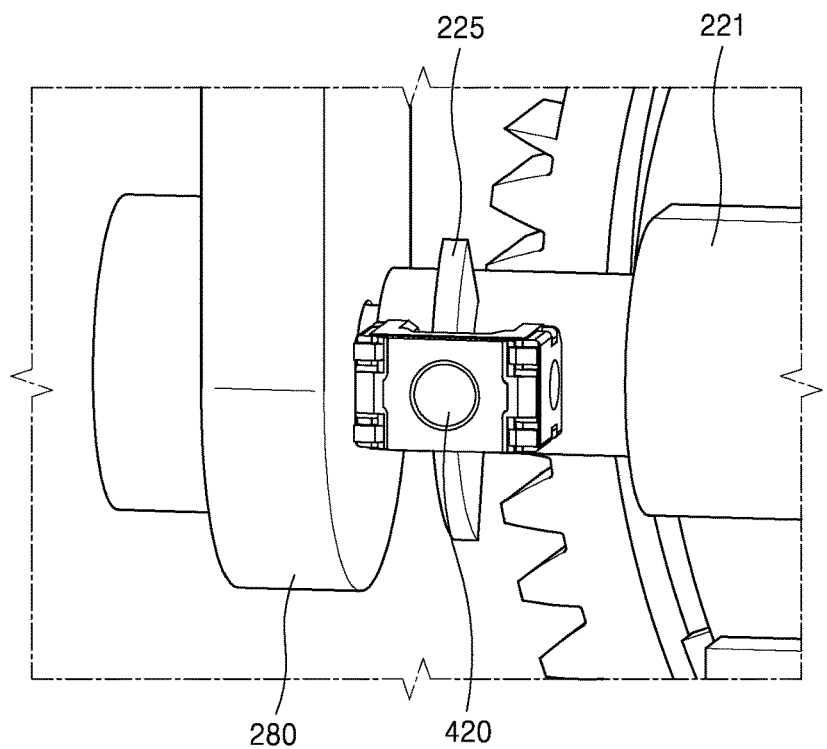
FIG. 10 is a perspective view of a second location detection sensor according to an embodiment of the present disclosure.

FIG. 10 is a perspective view of a second location detection sensor according to an embodiment of the present disclosure.

Referring to FIG. 10, the second location detection sensor 420 may be disposed on the support 280. A second detector 225 is provided on the lens holder 220. The second detector 225 may protrude from the rotational shaft 221. For example, when a photo interrupter is used as the second location detection sensor 420, an edge of the second detector 225 may be detected by the second location detection sensor 420, and then the rotating angle of the lens holder 220 may be calculated from a driving period of the motor 261. When a photo reflector is used as the second location detection sensor 420, reflection patterns (not shown) obtained by alternating white and black portions may be provided on the second detector 225, and the rotating angle of the lens holder 220 may be calculated from the number of reflection patterns detected by the second location detection sensor 420.

According to this structure, a second rotation amount, namely, a pitch-axis rotation amount may be detected.

Figure 11:
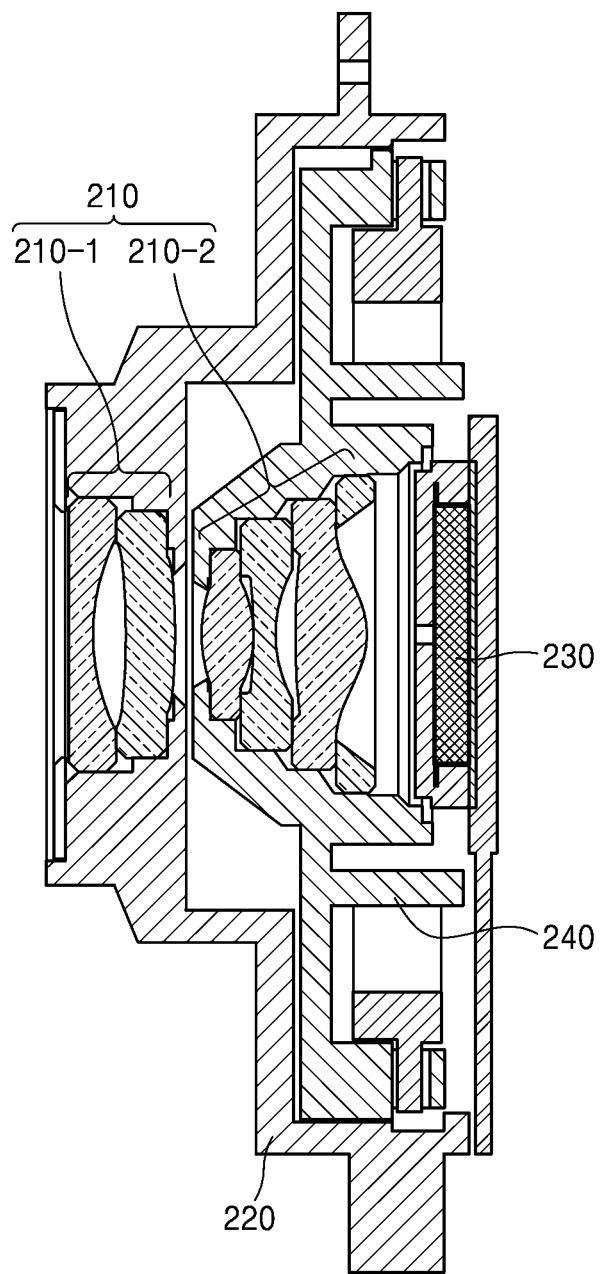
FIG. 11 is a cross-sectional view illustrating a first lens unit disposed on a photographing sensor holder according to an embodiment of the present disclosure.

FIG. 11 is a cross-sectional view illustrating a first lens unit disposed on a photographing sensor holder according to an embodiment of the present disclosure.

The photographing apparatus 200 as illustrated in FIG. 11 is different from the photographing apparatus 200 according to the previous embodiment in that some of the lenses included in the lens unit 210 perform a first rotation together with the photographing sensor 230.

Referring to FIG. 11, the lens unit 210 includes a first lens unit 210-1 disposed on the lens holder 220, and a second lens unit 210-2 disposed on the photographing sensor holder 240. Each of the first lens unit 210-1 and the second lens unit 210-2 may include one lens or a plurality of lenses. The first lens unit 210-1 and the second lens unit 210-2 form an optical system that focuses image light onto a photographing surface of the photographing sensor 230.

For example, the first lens unit 210-1 may include an AF lens group, and/or an optical image stabilization (OIS) lens group that performs a hand-shaking correction. The AF lens group and the OIS lens group continuously move during photography, and thus may be disposed on the first lens unit 210-1 so as not to be rotated together with the photographing sensor 230. However, the present disclosure is not limited thereto.

According to this structure, a lens group that does not continuously move during photography is included in the second lens unit 210-2 and disposed on the photographing sensor holder 240, and thus performs first rotation about the first axis A1 together with the photographing sensor 230. Since relative locations between the photographing sensor 230 and the second lens unit 210-2 do not change, a stable image may be obtained. A captured image may have improved resolution and improved definition.

Figure 12:
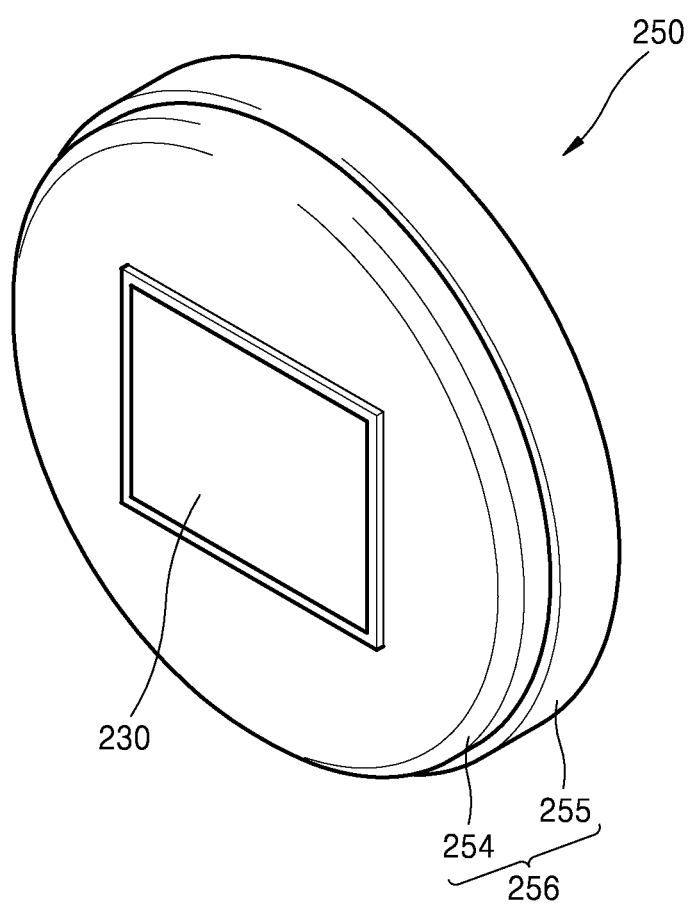
FIG. 12 is a perspective view of a first driver according to an embodiment of the present disclosure that includes an ultrasonic motor.

FIG. 12 is a perspective view of a first driver according to an embodiment of the present disclosure.

Referring to FIG. 12, the first driver 250 may include, as a driving source, a power device capable of detecting a driving amount, for example, a rotation amount. Accordingly, the first location detection sensor 420 may be omitted. The power device capable of detecting a driving amount may be any of various devices. For example, when a motor driven by a pulse driving method is used as the power device, the driving amount may be detected by summing the number of driving pulses. For example, the power device may include an ultrasonic motor 256. The ultrasonic motor 256 includes a rotor 254 and a stator 255. The stator 255 may be supported by the lens holder 220 of FIG. 4. The photographing sensor 230 may be disposed on the rotor 254.

According to this structure, a photographing apparatus 200 capable of being rolled by a simple structure may be realized. The height of the photographing apparatus 200 may be reduced to thereby obtain a compact photographing apparatus 200. The power device capable of detecting a driving amount may also be an encoder-integrated motor.

Figure 13A:
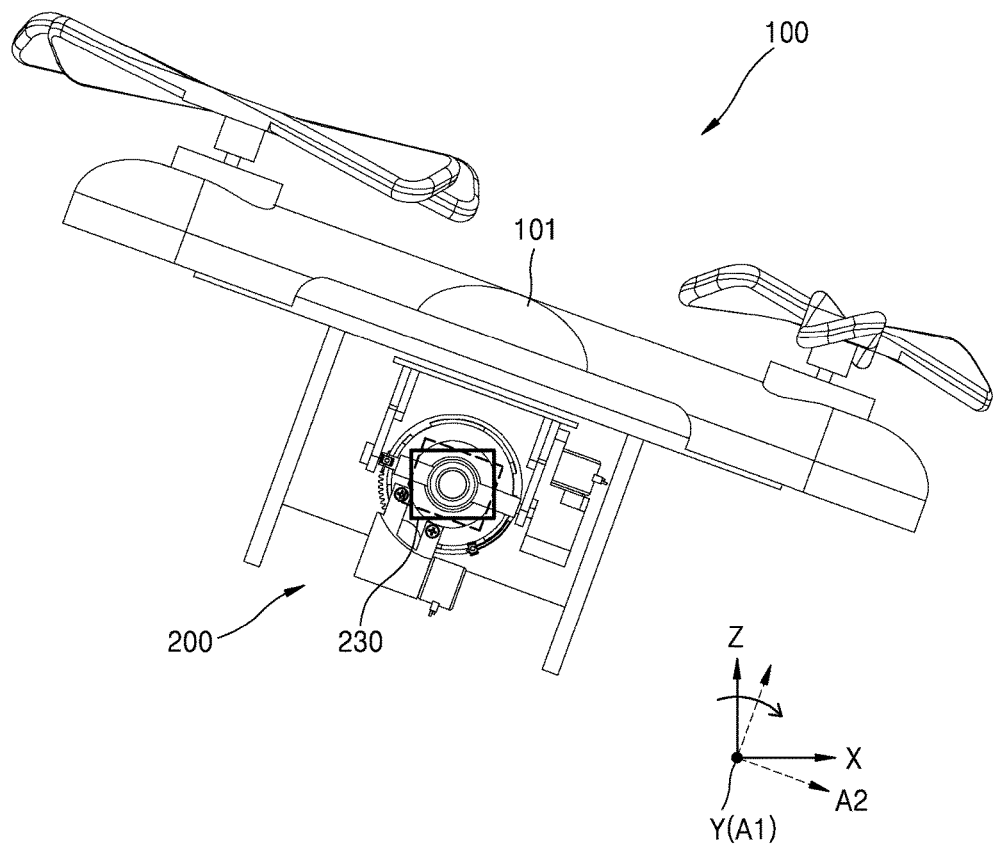
FIG. 13A is a front view illustrating an unmanned vehicle according to an embodiment of the present disclosure that is directed leftward.
Figure 13B:
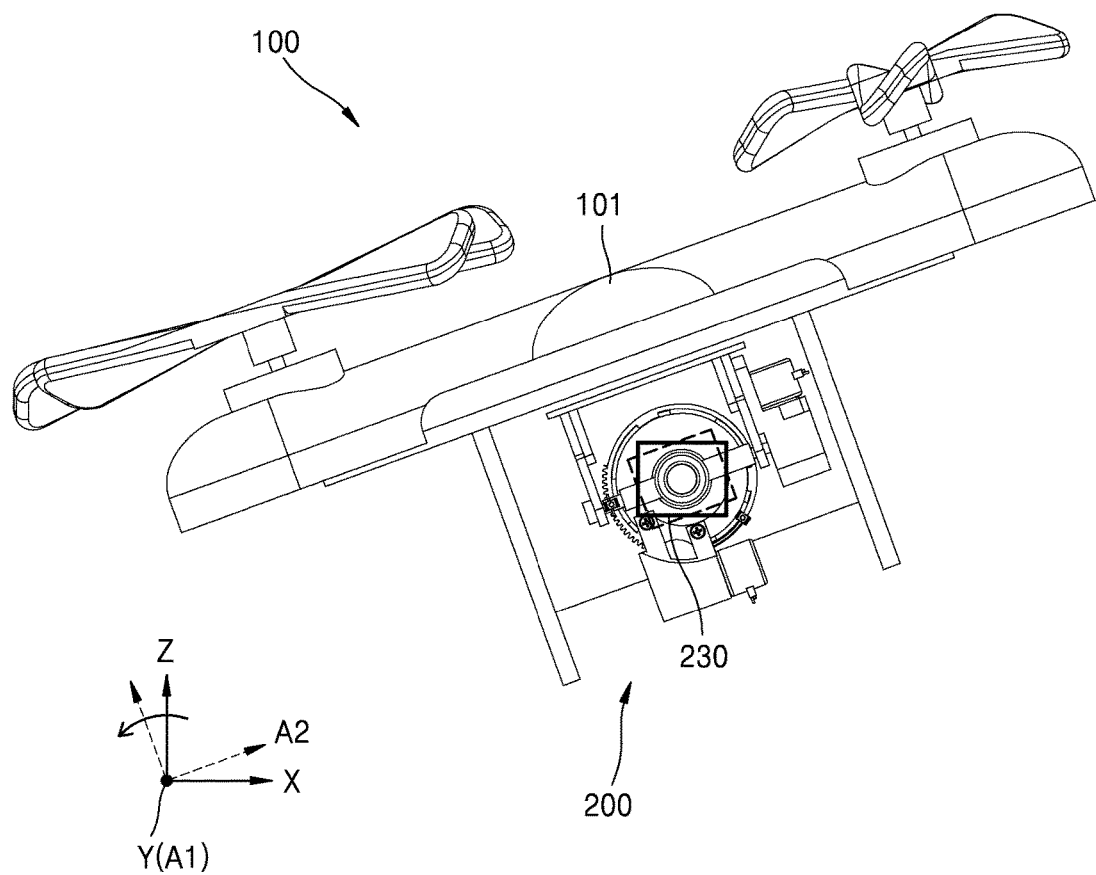
FIG. 13B is a front view illustrating an unmanned vehicle according to an embodiment of the present disclosure that is directed rightward.

FIG. 13A is a front view illustrating an unmanned vehicle according to an embodiment of the present disclosure that is directed leftward, and FIG. 13B is a front view illustrating an unmanned vehicle according to an embodiment of the present disclosure that is directed rightward. The leftward and rightward denote leftward and rightward as viewed from the unmanned vehicle 100, respectively.

Referring to FIGS. 13A, X, Y, and Z axes represent 3-dimensional (3D) absolute coordinates. When the unmanned vehicle 100 maintains a horizontal state in the air, the first axis A1 coincides with the Y axis, and the second axis A2 coincides with the X axis. When the unmanned vehicle 100 maintained in a horizontal state in the air is directed leftward, the unmanned vehicle 100 is inclined clockwise. In other words, as indicated by a dotted line, the unmanned vehicle 100 is inclined clockwise about the first axis A1. Therefore, the photographing apparatus 200 captures an image inclined clockwise from the original photographing direction.

In spite of the clockwise inclination of the unmanned vehicle 100 about the first axis A1, in order for the photographing apparatus 200 to capture an image in a horizontal state, the photographing apparatus 200 needs to be rotated in a direction that compensates for the inclination of the unmanned vehicle 100. According to the present embodiment, the photographing sensor 230 is rotated to compensate for the inclination of the unmanned vehicle 100.

When the photographing apparatus 200 is inclined clockwise, the attitude detector 160 or 320 transmits attitude information of the unmanned vehicle 100, namely, an inclination of the unmanned vehicle 100 about the first axis A1, directly to the photographing apparatus controller 290 or to the photographing apparatus controller 290 via the controller 110. The photographing apparatus controller 290 controls the first driver 250 to compensate for the received inclination. For example, when the unmanned vehicle 100 is inclined clockwise by 30 degrees with respect to the first axis A1 as shown in FIG. 13A, the attitude detector 160 or 320 transmits the inclination of 30 degrees and the inclination direction as the attitude information to the photographing apparatus controller 290. The photographing apparatus controller 290 drives the first driver 250 to rotate the photographing sensor holder 240 counterclockwise by 30 degrees, in order to maintain a photographing direction to be a photographing direction before the photographing apparatus 200 is inclined. Accordingly, even when the unmanned vehicle 100 is directed leftward, the photographing apparatus 200 may capture the same image as an image captured at an angle of the unmanned vehicle 100 in a horizontal state.

Referring to FIG. 13B, when the unmanned vehicle 100 maintained in a horizontal state in the air is directed rightward, the unmanned vehicle 100 is inclined counterclockwise. In other words, as indicated by a dotted line, the unmanned vehicle 100 is inclined counter clockwise about the first axis A1. Therefore, the photographing apparatus 200 captures an image inclined counterclockwise from the original photographing direction.

When the photographing apparatus 200 is inclined counterclockwise, the attitude detector 160 or 320 transmits attitude information of the unmanned vehicle 100, namely, an inclination of the unmanned vehicle 100 about the first axis A1, directly to the photographing apparatus controller 290 or to the photographing apparatus controller 290 via the controller 110. The photographing apparatus controller 290 controls the first driver 250 to compensate for the received inclination.

For example, when the unmanned vehicle 100 is inclined counterclockwise by 30 degrees with respect to the first axis A1 as shown in FIG. 13B, the attitude detector 160 or 320 transmits the inclination of 30 degrees and the inclination direction as the attitude information to the photographing apparatus controller 290. The photographing apparatus controller 290 drives the first driver 250 to rotate the photographing sensor holder 240 clockwise by 30 degrees, in order to maintain a photographing direction to be the photographing direction before the photographing apparatus 200 is inclined. Accordingly, even when the unmanned vehicle 100 is directed rightward, the photographing apparatus 200 may capture the same image as an image captured at an angle at which the unmanned vehicle 100 is in a horizontal state.

Figure 14A:
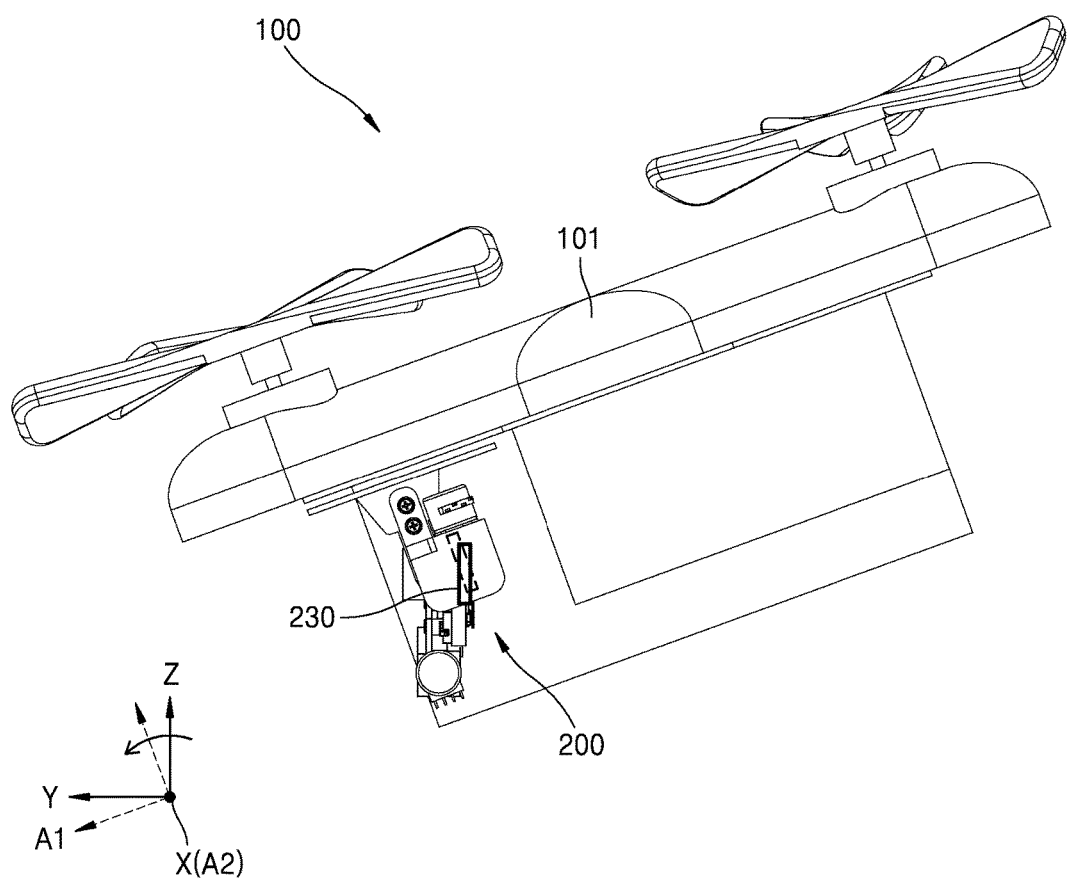
FIG. 14A is a side view illustrating an unmanned vehicle according to an embodiment of the present disclosure that flies forward.
Figure 14B:
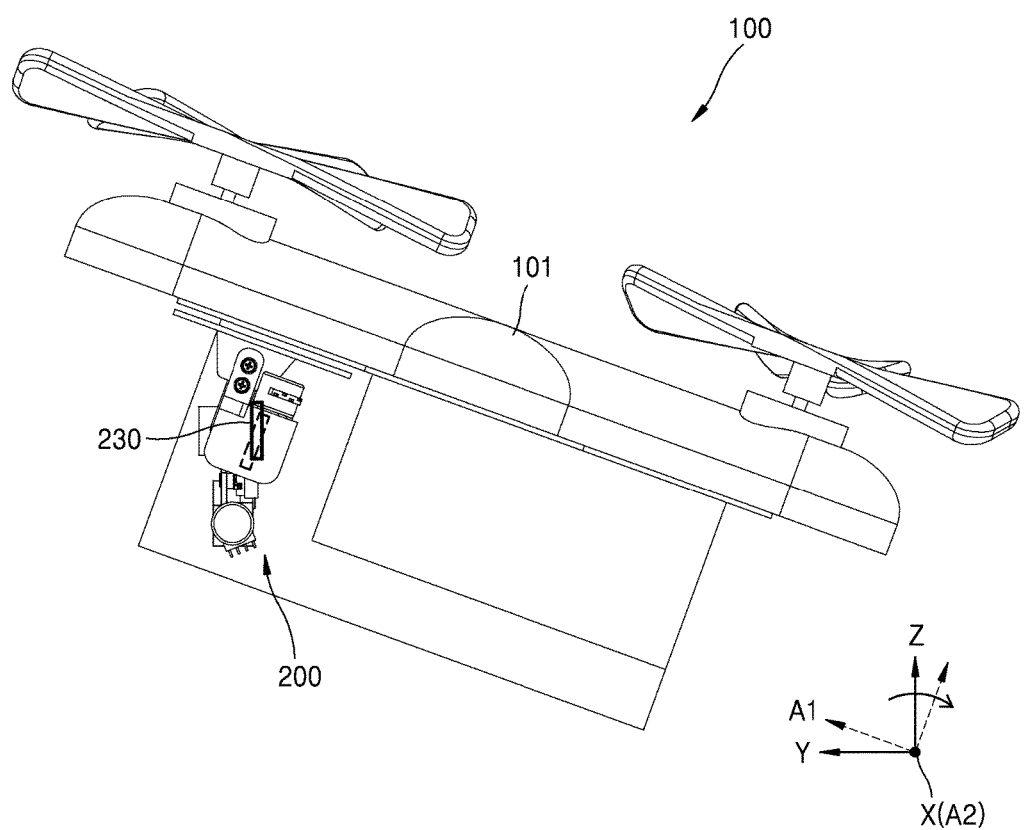
FIG. 14B is a side view illustrating an unmanned vehicle according to an embodiment of the present disclosure that flies backward.

FIG. 14A is a side view illustrating an unmanned vehicle according to an embodiment of the present disclosure that flies forward, and FIG. 14B is a side view illustrating an unmanned vehicle according to an embodiment of the present disclosure that flies backward.

Referring to FIG. 14A, when the unmanned vehicle 100 maintains a horizontal state in the air, the first axis A1 coincides with the Y axis, and the second axis A2 coincides with the X axis. When the unmanned vehicle 100, maintained in a horizontal state in the air, moves forward, the head of the unmanned vehicle 100 is inclined downward while maintaining the forward movement. In other words, as indicated by a dotted line, the unmanned vehicle 100 is inclined downward about the second axis A2. Therefore, the photographing apparatus 200 captures an image downward from the original photographing direction.

In spite of the downward inclination of the unmanned vehicle 100 about the second axis A2, in order for the photographing apparatus 200 to capture an image in a horizontal state, the photographing apparatus 200 needs to be rotated in a direction that compensates for the inclination of the unmanned vehicle 100. According to the present embodiment, the photographing unit 201 is rotated to compensate for the inclination of the unmanned vehicle 100.

When the photographing apparatus 200 is inclined downwards, the attitude detector 160 or 320 transmits attitude information of the unmanned vehicle 100, namely, the inclination of the unmanned vehicle 100 about the second axis A2, directly to the photographing apparatus controller 290 or to the photographing apparatus controller 290 via the controller 110. The photographing apparatus controller 290 controls the second driver 260 to compensate for the received inclination.

For example, when the unmanned vehicle 100 is inclined downward by 45 degrees with respect to the second axis A2 as shown in FIG. 14A, the attitude detector 160 or 320 transmits the inclination of 45 degrees and the inclination direction as the attitude information to the photographing apparatus controller 290. To maintain the original photographing direction, the photographing apparatus controller 290 drives the second driver 260 to rotate the photographing unit 201 leftward (clockwise about the second axis A2) by 45 degrees. Accordingly, even when the unmanned vehicle 100 is moving forward, the photographing apparatus 200 may capture the same image as an image captured at an angle at which the unmanned vehicle 100 is in a horizontal state.

Referring to FIG. 14B, when the unmanned vehicle 100 maintained in a horizontal state in the air moves backward, the head of the unmanned vehicle 100 moves backward while being directed upward. In other words, as indicated by a dotted line, the unmanned vehicle 100 is inclined upward about the second axis A2. Therefore, the photographing apparatus 200 captures an image corresponding to an upper side of the original photographing direction.

When the photographing apparatus 200 is inclined upwards, the attitude detector 160 or 320 transmits attitude information of the unmanned vehicle 100, namely, the inclination of the unmanned vehicle 100 about the second axis A2, directly to the photographing apparatus controller 290 or to the photographing apparatus controller 290 via the controller 110. The photographing apparatus controller 290 controls the second driver 260 to compensate for the received inclination.

For example, when the photographing apparatus 200 is inclined upward by 45 degrees as shown in FIG. 14B, the attitude detector 160 or 320 transmits the inclination of 45 degrees and the inclination direction as the attitude information to the photographing apparatus controller 290. To maintain the original photographing direction, the photographing apparatus controller 290 drives the second driver 260 to rotate the photographing unit 201 rightward (counter clockwise about the second axis A2) by 45 degrees. Accordingly, even when the unmanned vehicle 100 is moving backward, the photographing apparatus 200 may capture the same image as an image captured at an angle at which the unmanned vehicle 100 is in a horizontal state.

Similar to when the unmanned vehicle 100 moves forward or backward, the same second rotation is applied to when the head of the unmanned vehicle 100 is inclined downwards or upwards while the unmanned vehicle 100 is hovering.

As such, the photographing apparatus 200 may drive the first driver 250 and the second driver 260 to correct the photographing direction by using the attitude information of the unmanned vehicle 100 (or the photographing apparatus 200) received from the attitude detector 160 or 320.

The controller 110 or the photographing apparatus controller 290 may independently control the first driver 250 and the second driver 260, based on the received attitude information. The controller 110 or the photographing apparatus controller 290 may simultaneously control the first driver 250 and the second driver 260, based on attitude information received according to circumstances.

Figure 15:
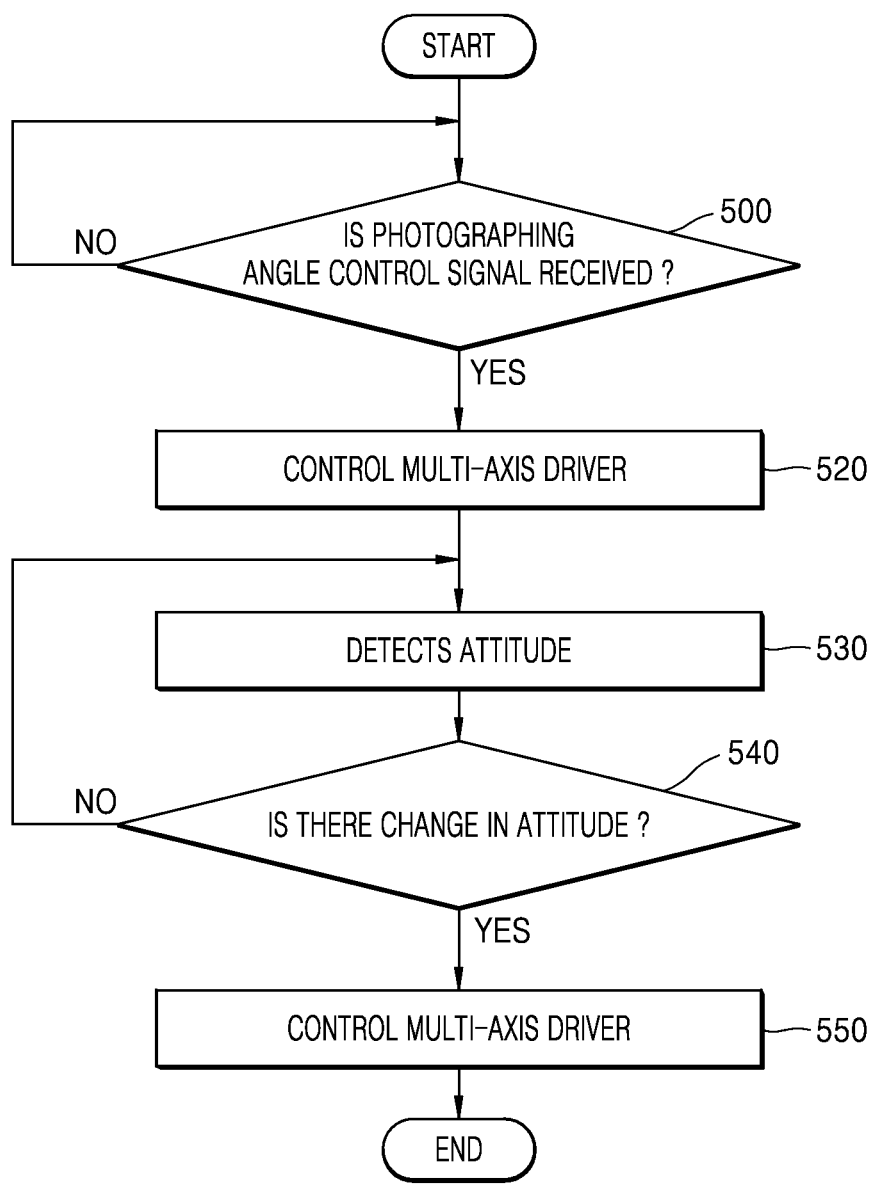
FIG. 15 is a flowchart of a method of controlling a photographing apparatus according to an embodiment of the present disclosure.

FIG. 15 is a flowchart of a method of controlling a photographing apparatus according to an embodiment of the present disclosure.

Referring to FIG. 15, the multi-axis driver 202 may be driven to arbitrarily change a photographing angle. The controller 110 of the unmanned vehicle 100 or the photographing apparatus controller 290 may receive a photographing angle control signal from the remote controller 1000.

For example, in operation 500, the controller 110 of the unmanned vehicle 100 or the photographing apparatus controller 290 determines whether a control signal received from the remote controller 1000 includes a photographing angle control signal. When photographing angle information is contained in and extracted from the photographing angle control signal, the controller 110 of the unmanned vehicle 100 or the photographing apparatus controller 290 controls the multi-axis driver 202 to drive the photographing apparatus 200 to perform the first rotation (roll-axis driving) and/or the second rotation (pitch-axis driving) to obtain a desired photographing angle, based on the extracted photographing angle information, in operation 520.

For example, the controller 110 of the unmanned vehicle 100 or the photographing apparatus controller 290 may receive from the remote controller 1000 a photographing angle control signal instructing that a photographing angle be changed downward by 30 degrees. In this case, the controller 110 or the photographing apparatus controller 290 drives the second driver 260 to change a photographing direction of the photographing unit 201 downward, based on the received photographing angle control signal.

The controller 110 of the unmanned vehicle 100 or the photographing apparatus controller 290 may receive from the remote controller 1000 a photographing angle control signal instructing that the photographing sensor 230 be changed leftward or rightward by 90 degrees from the current direction. In response to the photographing angle control signal, the controller 110 or the photographing apparatus controller 290 drives the first driver 250 to rotate the photographing sensor holder 240 by 90 degrees about the first axis A1, based on the received photographing angle control signal. Accordingly, without rotating the entire portion of the unmanned vehicle 100 by 90 degrees, an image having a vertical structure may be captured.

The photographing apparatus controller 290 may communicate with the remote controller 1000 via the communicator 300 rather than via the controller 110 of the unmanned vehicle 100 to independently drive the first rotation and/or the second rotation.

During photography, attitude control may be continuously performed.

In operation 530, the attitude detector 160 or 320 detects an attitude of the unmanned vehicle 100 or the photographing apparatus 200 in flight. In operation 540, the controller 110 or the photographing apparatus controller 290 determines whether there is a change in attitude information received from the attitude detector 160 or 320.

When there is no change in the attitude information, the attitude detector 160 or 320 repeatedly determines whether there is a change in the attitude information received from the attitude detector 160 or 320. When there is a change in the attitude information, the controller 110 or the photographing apparatus controller 290 controls the multi-axis driver 202 in operation 550 as described above with reference to FIGS. 13A, 13B, 14A, and 14B, based on the changed attitude information.

The first and second rotation amounts detected by the first and second location detection sensors 410 and 420 may be provided as photographing angle information of the photographing unit 201 to the controller 110 or the photographing apparatus controller 290 during the photographing angle control operation and the attitude control operation. Based on the photographing angle information, the controller 110 or the photographing apparatus controller 290 may apply a feedback control to the photographing angle control operation and the attitude control operation.

For example, when the photographing unit 201 has changed the photographing direction downward by 30 degrees, the second location detection sensor 420 senses a rotation amount of the second detector 225 and detects a rotation amount of the photographing unit 201. The second location detection sensor 420 transmits the detected rotation amount to the controller 110 of the unmanned vehicle 100 or the photographing apparatus controller 290.

The controller 110 of the unmanned vehicle 100 or the photographing apparatus controller 290 may determine whether the photographing unit 201 has been rotated downward by 30 degrees, by analyzing received rotation amount data. When the photographing unit 201 has been rotated by less than or more than 30 degrees, the controller 110 of the unmanned vehicle 100 or the photographing apparatus controller 290 controls the second driver 260 again to rotate the photographing unit 201 downward by 30 degrees.

When the photographing sensor 230 has been rotated by 90 degrees leftward or rightward from a current direction, the first location detection sensor 410 senses a rotation amount of the first detector 244 and detects a rotation amount of the photographing sensor 230. The first location detection sensor 410 transmits the detected rotation amount to the controller 110 of the unmanned vehicle 100 or the photographing apparatus controller 290.

The controller 110 of the unmanned vehicle 100 or the photographing apparatus controller 290 determines whether the photographing sensor holder 240 has been rotated downward by 90 degrees, by analyzing received rotation amount data. When the photographing sensor holder 240 has been rotated by less than or more than 90 degrees, the controller 110 of the unmanned vehicle 100 or the photographing apparatus controller 290 controls the second driver 250 again to rotate the photographing sensor holder 240 by 90 degrees.

The controller 110 controls a flight operation of the unmanned vehicle 100 by using a signal received from the remote controller 1000. The controller 110 may transmit the received signal to the photographing apparatus controller 290 to control an operation of the photographing apparatus 200. Accordingly, the photographing apparatus 200 may be controlled by the remote controller 1000.

The controller 110 may directly control the multi-axis driver 202 by using the attitude information of the attitude detector 160, rather than via the photographing apparatus controller 290. The attitude detector 160 mounted on the unmanned vehicle 100 may transmit the attitude information of the unmanned vehicle 100 to the controller 110. The controller 110 may control the first driver 250 and the second driver 260 of the photographing apparatus 200 based on the attitude information to drive the first rotation (roll-axis driving) and the second rotation (pitch-axis driving). In this case, the attitude detector 320 does not need to be included in the photographing apparatus 200.

The attitude information of the photographing apparatus 200 or the unmanned vehicle 100 may be detected from an image received via the photographing apparatus 200. By setting a predetermined region in the image received via the photographing apparatus 200 and detecting a motion change of a subject present in the predetermined region from a previous/next frame, the attitude information of the photographing apparatus 200 or the unmanned vehicle 100 may be detected inversely.

The photographing apparatus controller 290 may communicate with the remote controller 1000 via the communicator 300 rather than via the controller 110 of the unmanned vehicle 100 to independently drive the first rotation (roll-axis driving) and the second rotation (pitch-axis driving) according to the photographing angle control signal.

The remote controller 1000 may include various electronic devices. For example, the remote controller 1000 may include at least one of a smartphone, a tablet personal computer (PC), a mobile phone, an image phone, an e-book reader, a desktop PC, a laptop PC, a netbook computer, a workstation, a server, a personal digital assistant (PDA), a portable multimedia player (PMP), a Moving Picture Experts Group phase 1 or phase 2 (MPEG-1 or MPEG-2) audio layer 3 (MP3) player, a mobile medical apparatus, a camera, and a wearable device.

Figure 16:
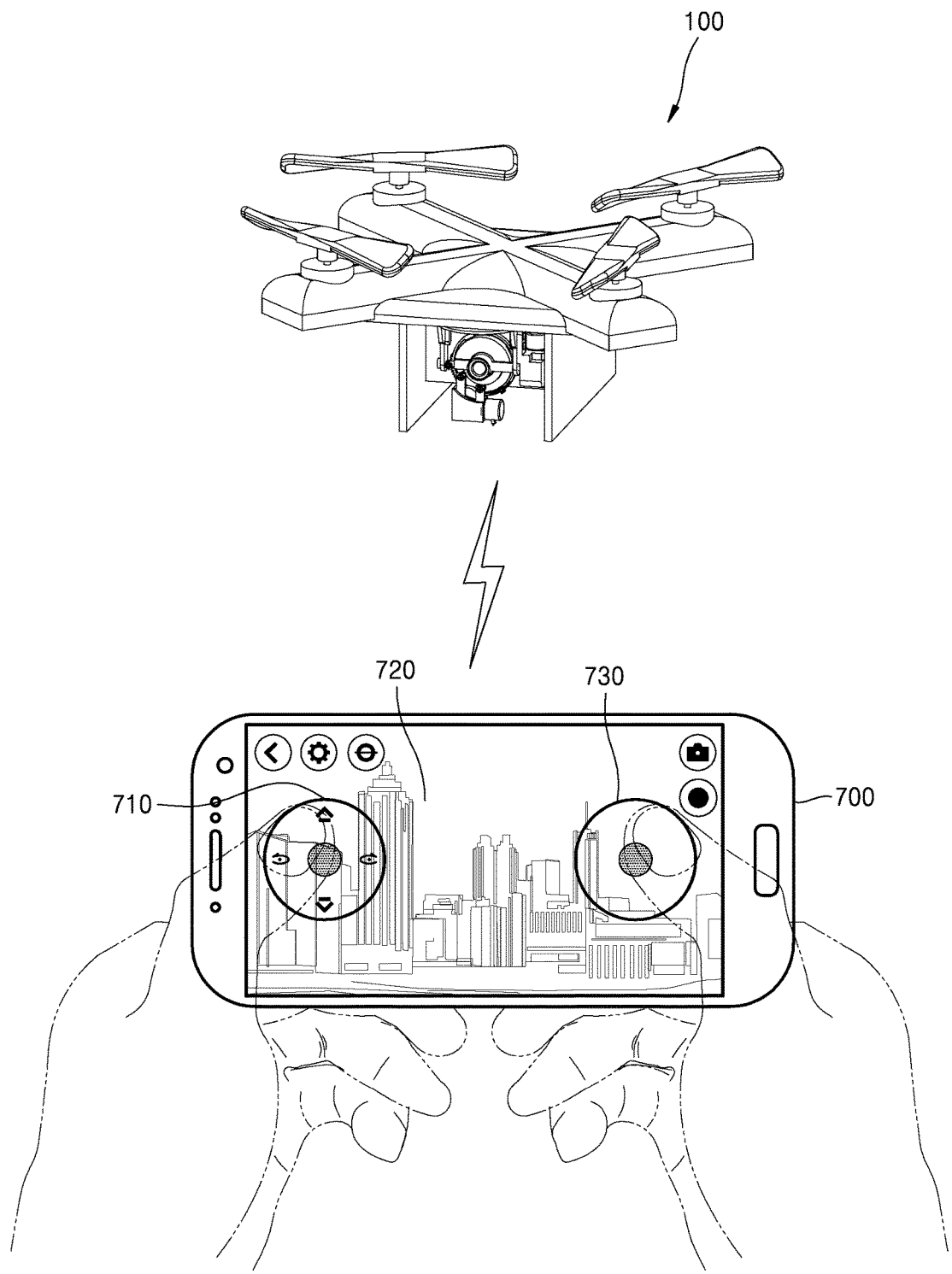
FIG. 16 illustrates an embodiment of controlling an unmanned vehicle by using a wireless terminal according to an embodiment of the present disclosure.

FIG. 16 illustrates an embodiment of controlling an unmanned vehicle by using a wireless terminal according to an embodiment of the present disclosure.

Referring to FIG. 16, the smartphone 700 may control the unmanned vehicle 100 by executing an application related with the unmanned vehicle 100, which is included in the smartphone 700, or an application related with the unmanned vehicle 100, which is downloaded from a server.

The screen of the smartphone 700 may display an image 720 currently captured by the unmanned vehicle 100, in real time. A portion of the screen of the smartphone 700 may display an icon 710 capable of controlling an operation of the unmanned vehicle 100 and an icon 730 capable of controlling a movement of a photographing apparatus 200. A user may control movements of the unmanned vehicle 100 and the photographing apparatus 200 by using a gesture of touching or dragging icons or a signal generated according to an attitude change by moving the smartphone 700 in all directions.

Methods according to embodiments of the present disclosure can be embodied as program commands executable by various computer means and can be recorded on a computer-readable recording medium. The computer-readable recording medium may include program commands, data files, data structures, and the like separately or in combinations. For example, the computer-readable recording medium may be a volatile or non-volatile storage device (e.g., read-only memory (ROM)), memory (e.g., random-access memory (RAM), a memory chip, a device, or an integrated circuit), or a storage medium optically or magnetically recordable and simultaneously readable by a machine (for example, a computer) (e.g., a CD, a DVD, a magnetic disk, or a magnetic tape), regardless of whether it is deletable or re-writable. Memory included in a mobile terminal is an example of a machine-readable storage medium adequate for storing a program or programs including instructions that realize embodiments of the present disclosure. The program commands to be recorded on the computer-readable recording medium may be specially designed and configured for the present disclosure or may be well-known to and usable by one of ordinary skill in the art of computer software.

It should be understood that embodiments described herein should be considered in a descriptive sense only and not for purposes of limitation. Descriptions of features or aspects within each embodiment should typically be considered as available for other similar features or aspects in other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A photographing apparatus comprising:
   a photographing device comprising:
      a photographing sensor, and
      a lens device for focusing image light onto the photographing sensor;
   a first driver configured to drive the photographing sensor to perform a first rotation about a first axis that coincides with an optical axis of the lens device; and
   a second driver configured to drive the photographing sensor to perform a second rotation about a second axis that is perpendicular to the first axis,
   wherein, when the photographing sensor is rotated about the second axis, the optical axis and the first axis are changed, and the first driver is further configured to drive the photographing sensor to perform the first rotation about the changed first axis that coincides with the changed optical axis of the lens device.

2. The photographing apparatus of claim 1, further comprising:
   a base,
   wherein the photographing device is supported by the base to be rotated about the second axis.

3. The photographing apparatus of claim 2, wherein the second driver is supported by the base.

4. The photographing apparatus of claim 1, further comprising:
   a first location detection sensor to detect a rotation amount of the photographing sensor with respect to the first axis; and
   a second location detection sensor configured to detect a rotation amount of the photographing device and the first driver.

5. The photographing apparatus of claim 1, further comprising:
   at least one photographing apparatus processor configured to control the first driver and the second driver to perform the first rotation and the second rotation, based on attitude information of the photographing apparatus.

6. The photographing apparatus of claim 1, wherein the photographing device comprises:
   a lens holder to receive the lens device, and
   a photographing sensor holder to receive the photographing sensor and rotate the photographing sensor about the first axis.

7. The photographing apparatus of claim 6, wherein the first driver is supported by the lens holder.

8. The photographing apparatus of claim 1,
   wherein the lens device comprises a first lens device and a second lens device, and
   wherein the photographing device comprises:
      a lens holder to receive the first lens device, and
      a photographing sensor holder to receive the second lens device and the photographing sensor.

9. The photographing apparatus of claim 8, wherein the first driver is supported by the lens holder.

10. The photographing apparatus of claim 1, wherein the first driver comprises a power device that detects a driving amount thereof.

11. An unmanned vehicle comprising:
    a flying body; and
    a photographing apparatus mounted on the flying body,
    wherein the photographing apparatus comprises:
       a photographing sensor, a lens device for focusing image light onto the photographing sensor, a first driver configured to drive the photographing sensor to perform a first rotation about a first axis that coincides with an optical axis of the lens device, and a second driver configured to drive the photographing sensor to perform a second rotation about a second axis that is perpendicular to the first axis, and wherein, when the photographing sensor is rotated about the second axis, the optical axis and the first axis are changed, and the first driver is further configured to drive the photographing sensor to perform the first rotation about the changed first axis that coincides with the changed optical axis of the lens device.

12. The unmanned vehicle of claim 11, wherein the photographing apparatus further comprises:

a lens holder to receive the lens device; and a photographing sensor holder to receive the photographing sensor and perform the first rotation about the first axis.

13. The unmanned vehicle of claim 11, wherein the photographing apparatus further comprises:

a lens holder to receive the lens device; and a photographing sensor holder to receive the photographing sensor and rotate the photographing sensor about the first axis.

14. The unmanned vehicle of claim 11, wherein the lens device comprises a first lens device and a second lens device, and wherein the photographing apparatus comprises:

a lens holder to receive the first lens device, and a photographing sensor holder to receive the second lens device and the photographing sensor.

15. The unmanned vehicle of claim 14, wherein the first driver is supported by the lens holder.

16. The unmanned vehicle of claim 11, further comprising:

at least one processor configured to control the first driver and the second driver based on attitude information of the unmanned vehicle.

17. A method of controlling an attitude of a photographing apparatus, the method comprising:

capturing an image by using a photographing apparatus mounted on an unmanned vehicle, the photographing apparatus comprising a lens device and a photographing sensor on which image light transmitted by the lens device is focused;

detecting attitude information of the unmanned vehicle;

driving the photographing sensor to perform a first rotation about a first axis that coincides with an optical axis of the lens device, based on the attitude information of the unmanned vehicle;

driving the photographing sensor to perform a second rotation about a second axis that is perpendicular to the first axis, based on the attitude information of the unmanned vehicle; and when the photographing sensor is rotated about the second axis, changing the optical axis and the first axis, and driving the photographing sensor to perform the first rotation about the changed first axis that coincides with the changed optical axis of the lens device.

18. The method of claim 17, further comprising:

receiving a photographing angle control signal from an external source.

* * * * *